United States Patent [19]

Krystek et al.

[11] 4,216,529

[45] Aug. 5, 1980

[54] FLUID DISPENSING CONTROL SYSTEM

[75] Inventors: Michael S. Krystek, Spring Valley; George L. Hurley, III, Alpine; Steven R. Smith, San Diego; Stephen E. Rice, Del Mar, all of Calif.

[73] Assignee: General Atomic Company, San Diego, Calif.

[21] Appl. No.: 870,187

[22] Filed: Jan. 17, 1978

[51] Int. Cl.[2] .............................................. G06F 15/56

[52] U.S. Cl. .................................... 364/510; 364/465; 235/92 FL; 222/26

[58] Field of Search ............... 364/510, 464, 465, 479, 364/200, 900; 235/92 FL; 222/23-28, 36, 76

[56] References Cited

U.S. PATENT DOCUMENTS

| | | | |
|---|---|---|---|
| 3,878,377 | 4/1975 | Brunone | 235/92 FL |
| 3,894,658 | 7/1975 | Buell, Jr. | 364/465 |
| 3,895,738 | 7/1975 | Buchanan et al. | 364/465 |
| 3,927,800 | 12/1975 | Zinsmeyer et al. | 235/92 FL |
| 3,949,207 | 4/1976 | Savary et al. | 364/510 |
| 4,034,193 | 7/1977 | Jackson | 364/465 |
| 4,067,486 | 1/1978 | Hyde et al. | 235/92 FL |
| 4,074,356 | 2/1978 | Schiller et al. | 235/92 FL |
| 4,087,858 | 5/1978 | Pichler et al. | 235/92 FL |
| 4,107,777 | 8/1978 | Pearson et al. | 364/479 |
| 4,121,094 | 10/1978 | DiVito et al. | 235/92 FL |

*Primary Examiner*—Charles E. Atkinson
*Assistant Examiner*—Gary Chin
*Attorney, Agent, or Firm*—Fitch, Even & Tabin

[57] ABSTRACT

A system for monitoring and controlling the operation of a plurality of fluid dispensers, such as gasoline pumps or the like in a self-service gasoline station is disclosed. The system includes an operating console that may be located in a station building and has electronic displays, dispenser selecting push buttons and a keyboard including numeric and functional switches, all of which an operator can use to control the operation of the system. A mode select switch permits operation of the system in various modes, selected ones of which permit an operator to obtain various period totals of both volume and cost, to control normal postpay or prepay dispensing transactions, check inventory as well as set or reset the cost per volumetric unit, among other operations. The system can include electronic displays at the gasoline pump and permit price setting of the fluid product from the console.

20 Claims, 23 Drawing Figures

OUTPUT TRUTH TABLE
(HEXIDECIMAL)

| BUTTON | OUTPUT |
|---|---|
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 0 | F |
| CLEAR | A |
| • | B |
| $-VOL | C |
| CHANGE | D |
| PAID | E |
| UNUSED | 0 |

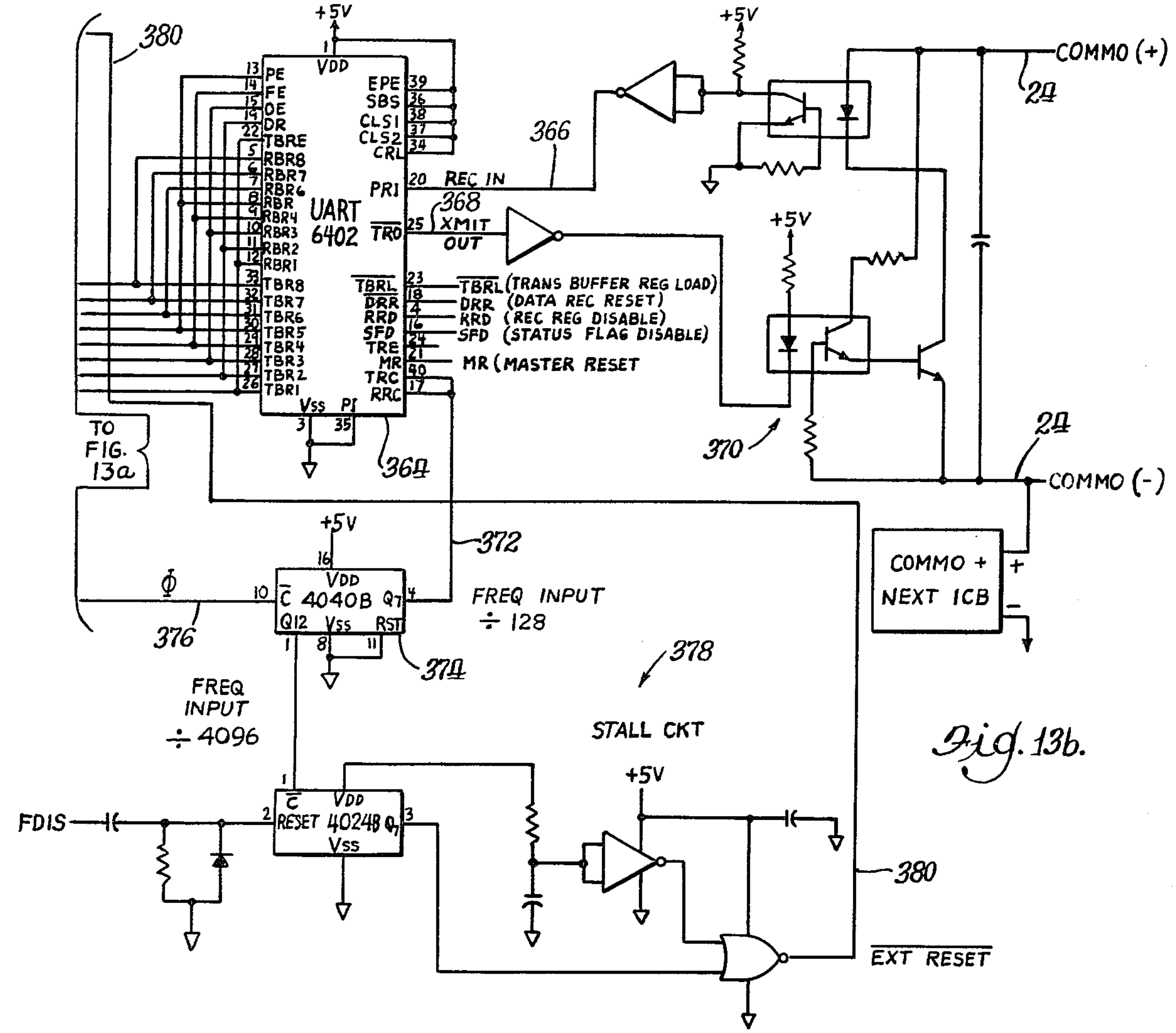
Fig. 13b.
Fig. 14.
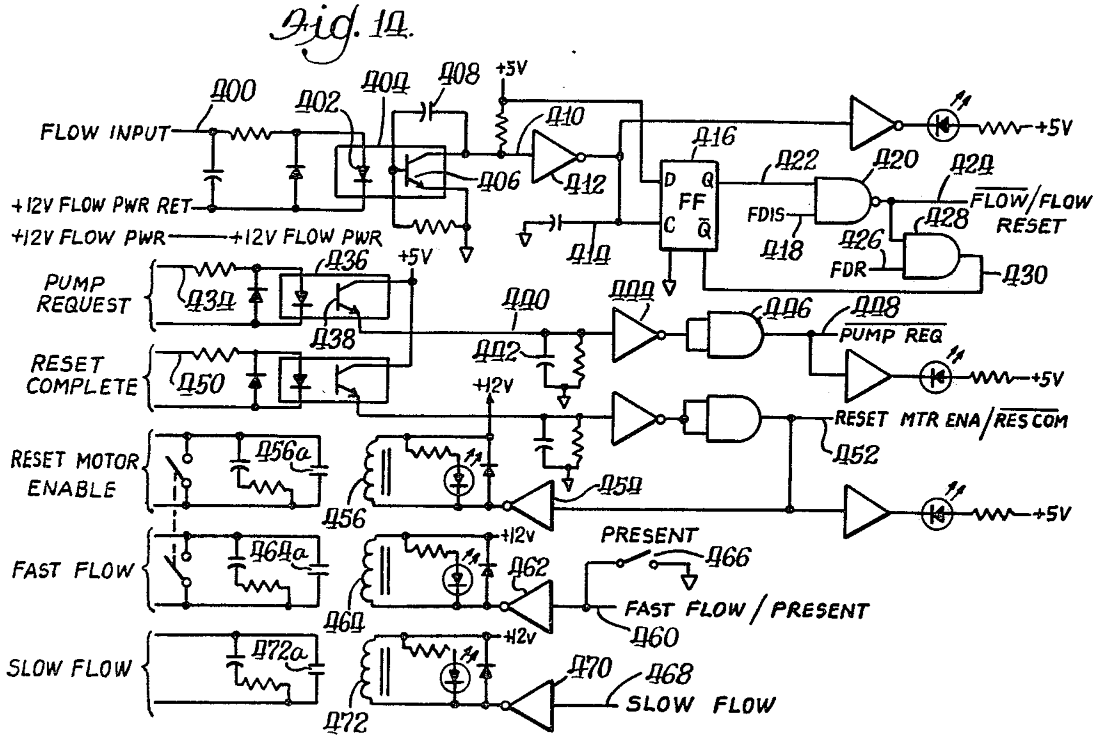

TO FIG. 13a
352
384
3853
SMI
390
392
74LS42
394
396
398
CPU READ
RAM WRITE
REG DR
2716
388
2112A4
386
CE1
CE2
RAM
READ/WRITE
RAMCE
CS1
CS2
CS3
CS4
+5V

HEATER
HEATER
GAL DISPLAY
DECIMA SHIFT
35 Hz
JUMPER
GAL SELECT
PRICE SELECT
$ SELECT
BOARD SELECT
600
BCD DATA
LSB (1)
(2)
(3)
MSB (4)
612
606
DIGIT SELECT MSD
DIGIT SELECT LSD
602
604
17654
REF A
REF B
GAL
GAL PRICE
$
JUMPER
+12V
14543B
MSD
610
614
608
LSD

FLUID DISPENSING CONTROL SYSTEM

CROSS REFERENCE TO RELATED APPLICATIONS

George L. Hurley III and Michael S. Krystek, Ser. No. 870,115, filed Jan. 17, 1978, for Rotating Shaft Pulse Generating Apparatus.

Fredy E. Graf and Michael S. Krystek, Ser. No. 870,113, filed Jan. 17, 1978, for a Battery Backup System.

REFERENCE TO MATERIAL INCORPORATED BY REFERENCE

Appendix A, which contains program listings for use with processing units disclosed herein.

DESCRIPTION

The present invention generally relates to monitoring and control systems and, more particularly, to systems for controlling the operation of fluid product dispensers, such as self-service gasoline stations, and the like.

The continued proliferation of what are commonly referred to as self-service gasoline stations has resulted in the continued development of various apparatus and systems for facilitating the more efficient operation of the stations with less manpower and to protect the station from unauthorized and/or dangerous use of the gasoline dispensers by the customers. While systems have been developed which enable a station operator to be positioned at a control console and receive information relating to the cost and quantity of the gasoline that is being dispensed at the various dispensers within his control, many of the systems have not provided much in the way of additional function and control. Other than receiving this data, coupled with the ability to authorize the use of a dispenser and to terminate a transaction if such is warranted or desired such systems offered little additional operational capability. Quite often such systems did little more than provide the instant information relating to a single transactional operation and performed few, if any additional functional operations, such as accounting and totalizing operations, inventory control or the like.

Accordingly, it is an object of the present invention to provide a monitoring and control system for use with a plurality of dispensers, such as gasoline dispensers or the like, which has greatly expanded operational capability.

Another object of the present invention is to provide such a system which is capable of being operated in several different operating modes, wherein each mode permits various functions to be performed, all of which contribute to a total system that provides accurate information concerning each of the dispensers, as well as for the entire system.

Another object of the present invention is to provide a system of the foregoing type which, due to its unique design, is capable of use with a relatively few number of dispensers, and can be easily adapted for controlling a relatively large number of dispensers, without significant expense or difficulty.

These and other objects and advantages of the present invention will become apparent upon reading the following detailed description, while referring to the attached drawings, in which.

Figure 6A:
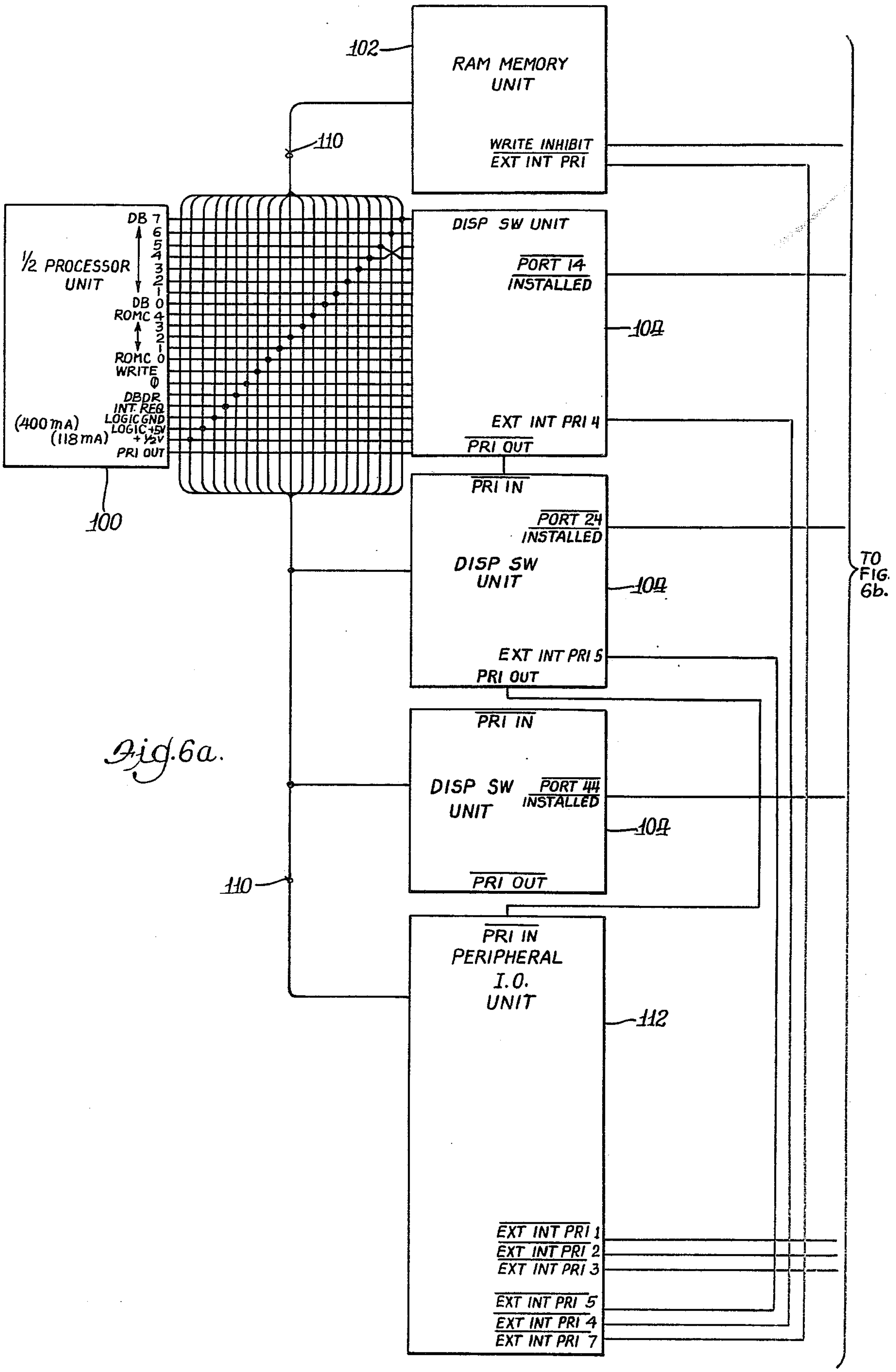
Figure 6B:
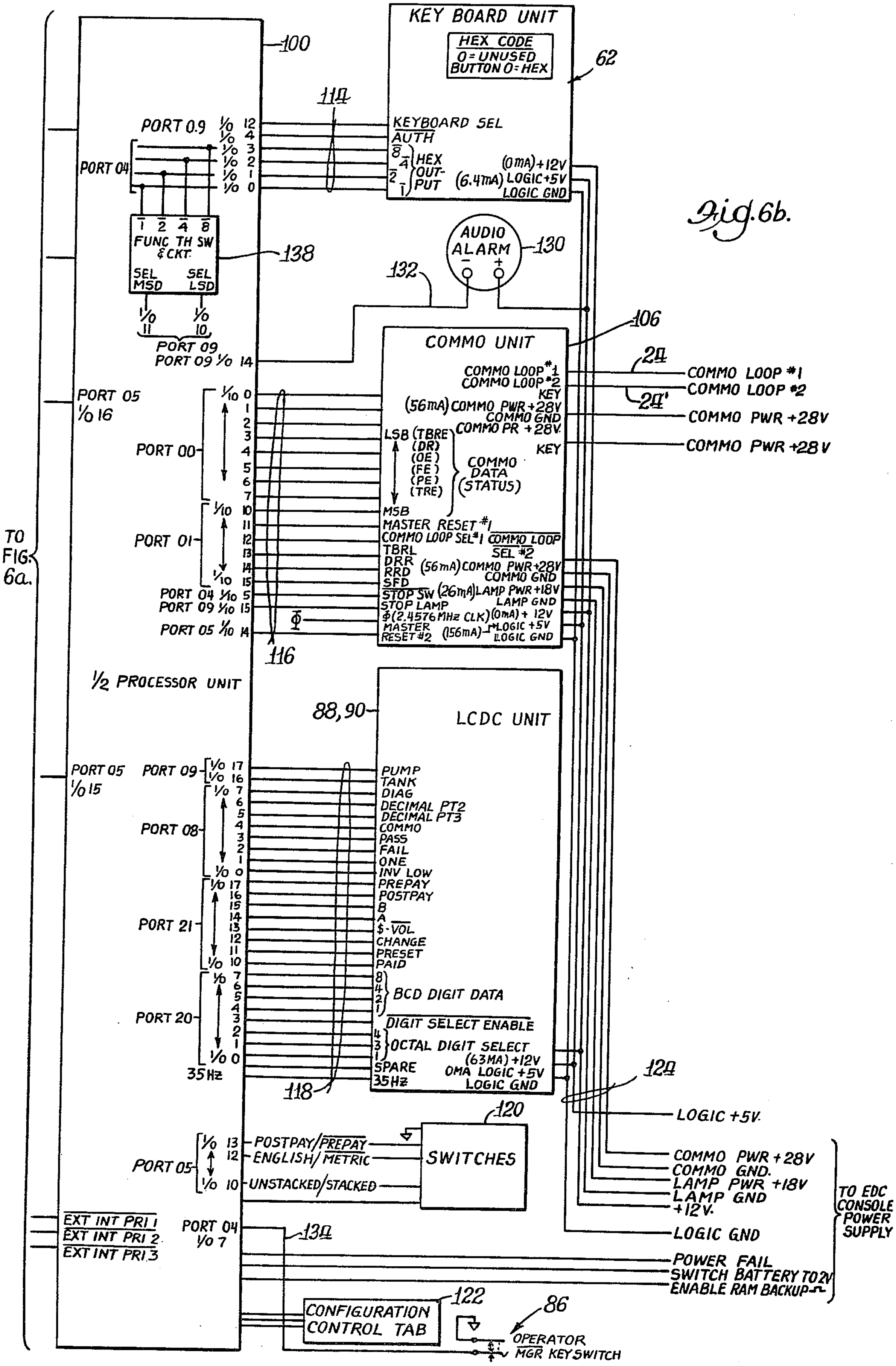
Figure 7A:
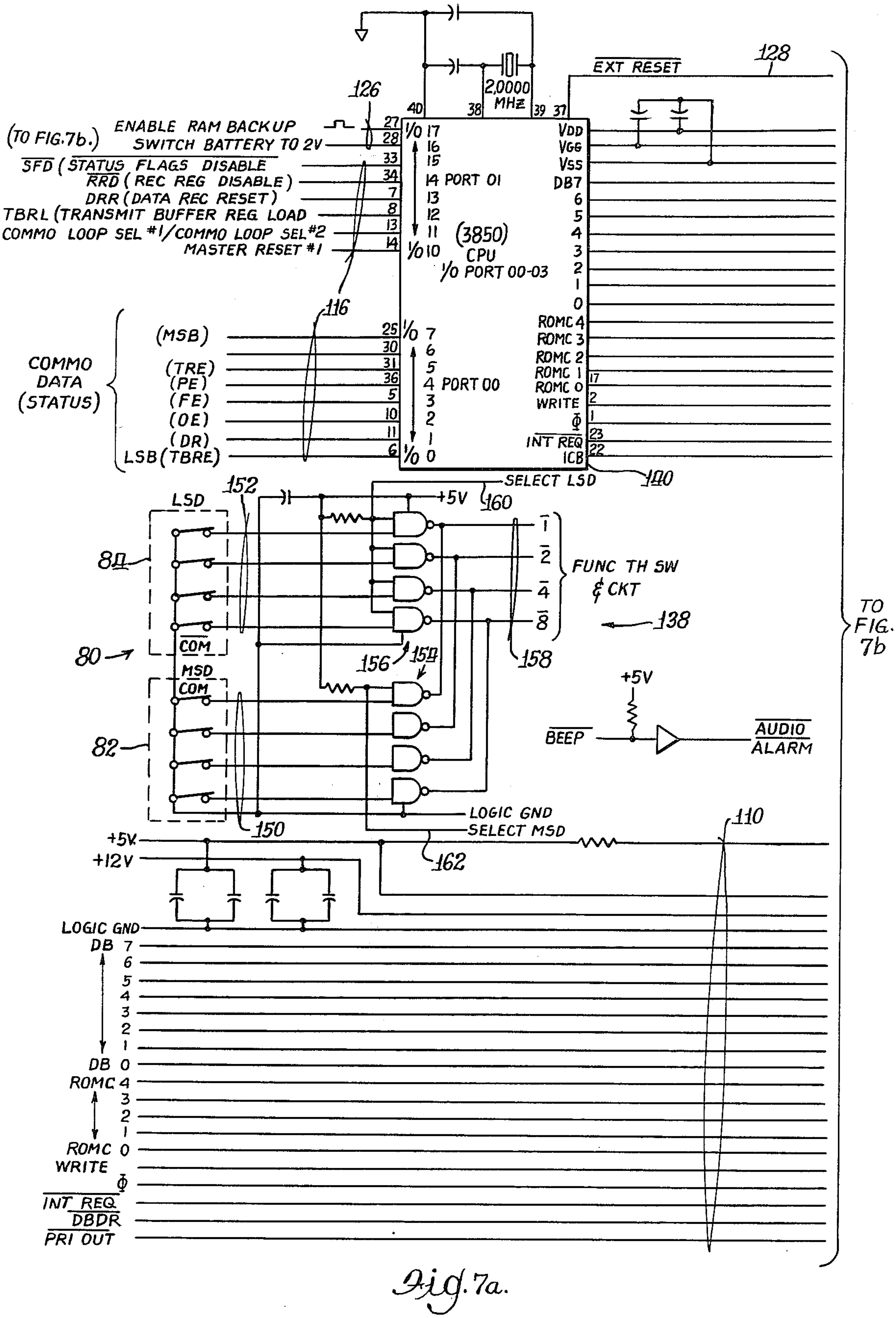
Figure 7B:
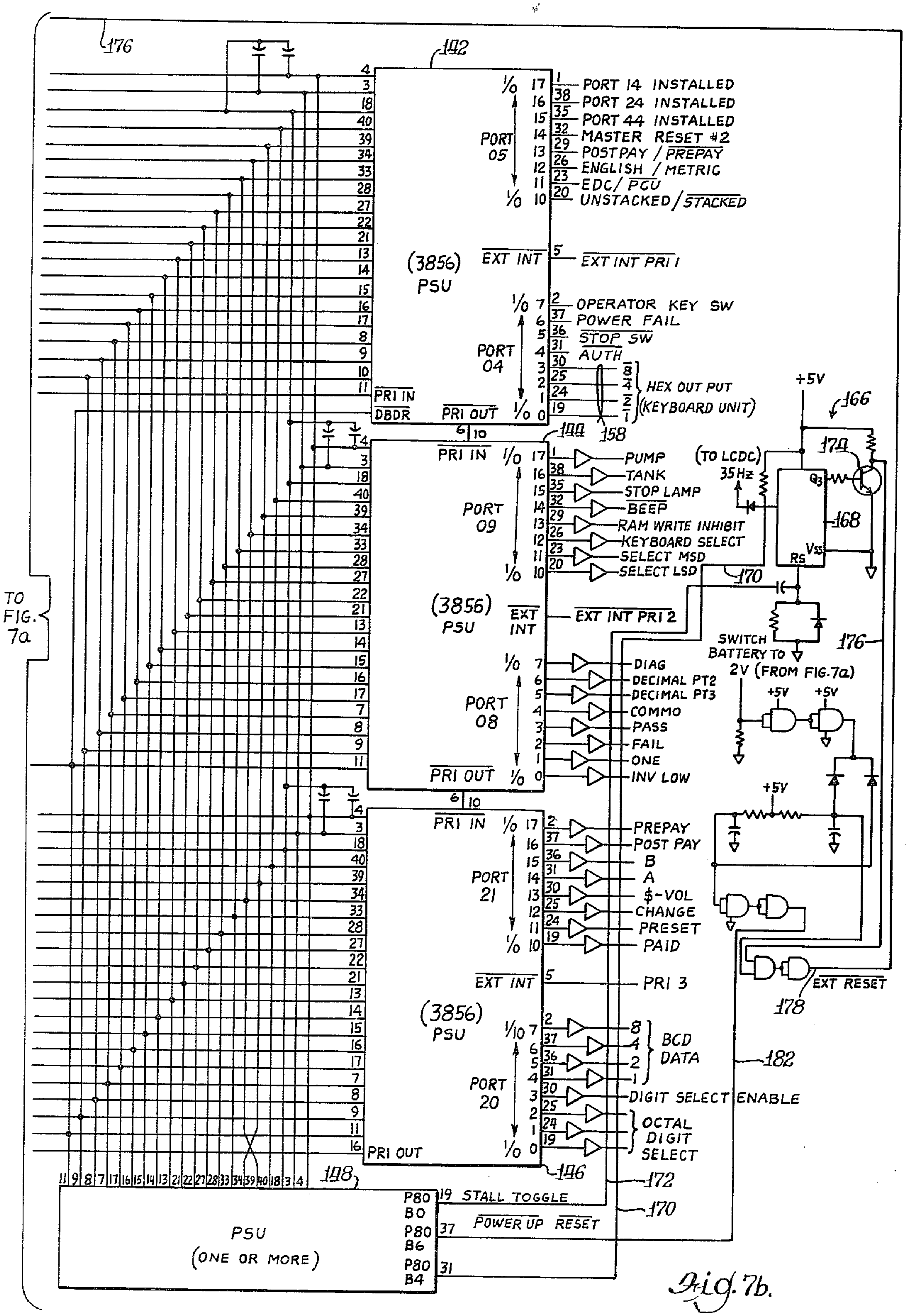
Figure 8A:
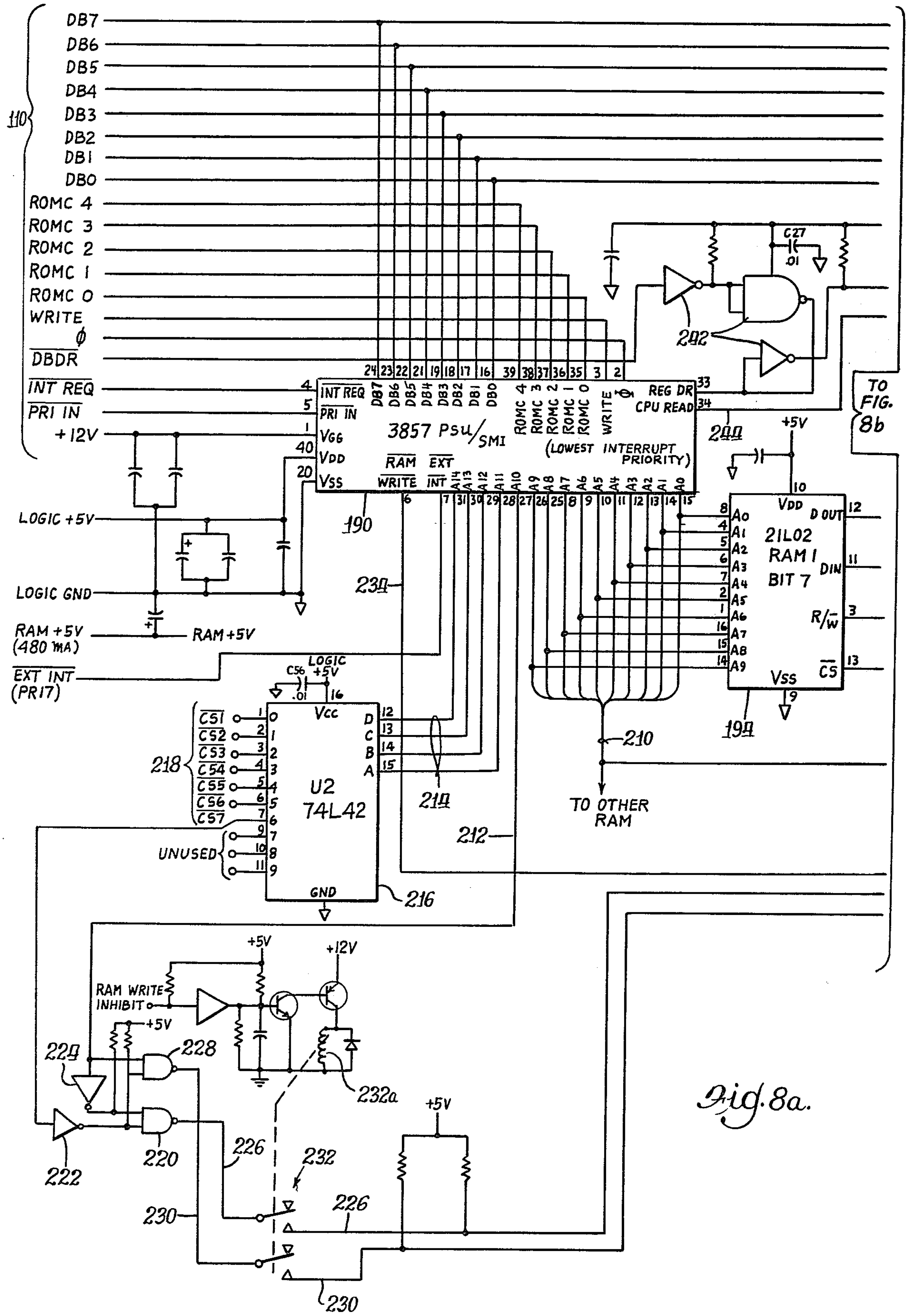
Figure 8B:
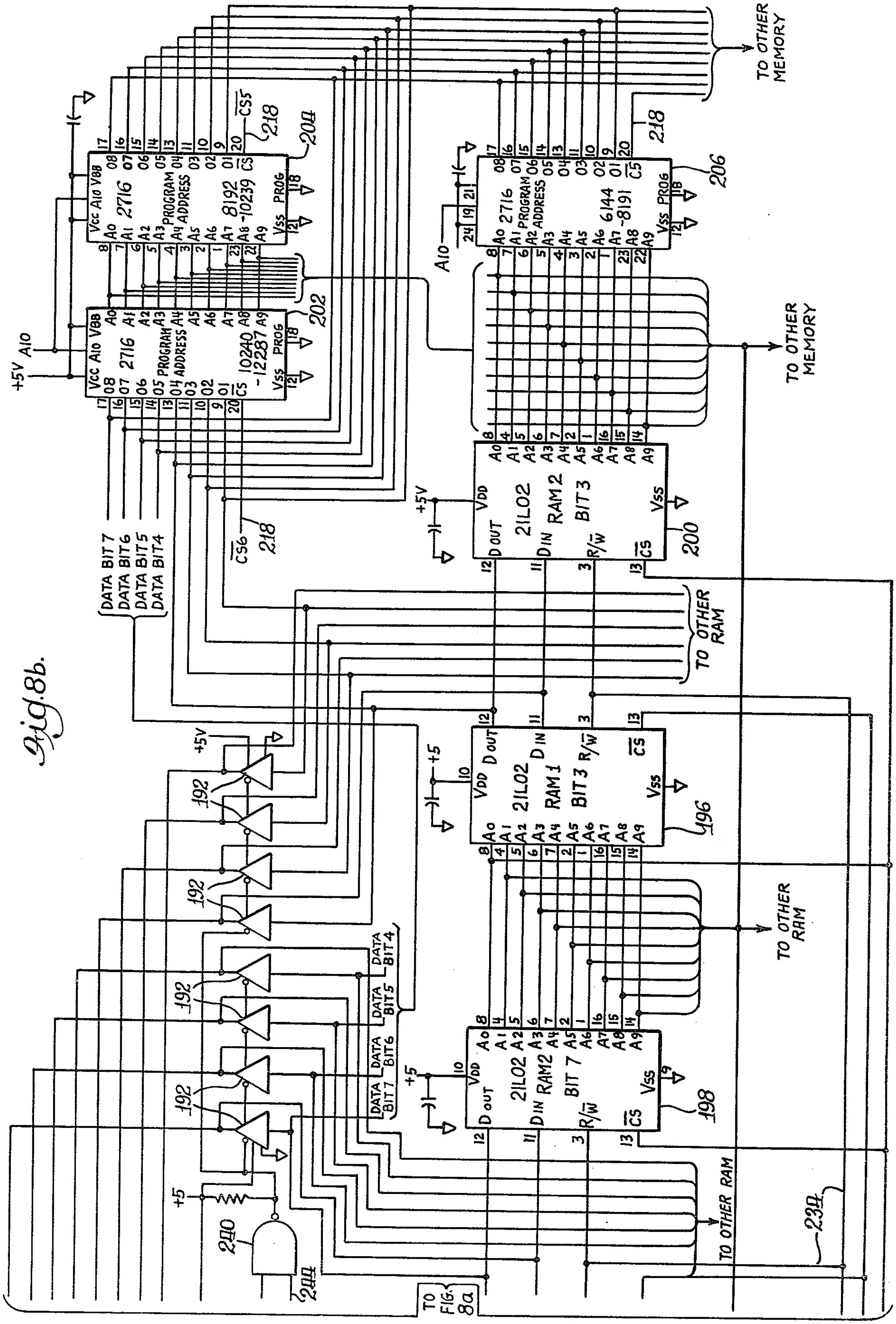
Figure 10:
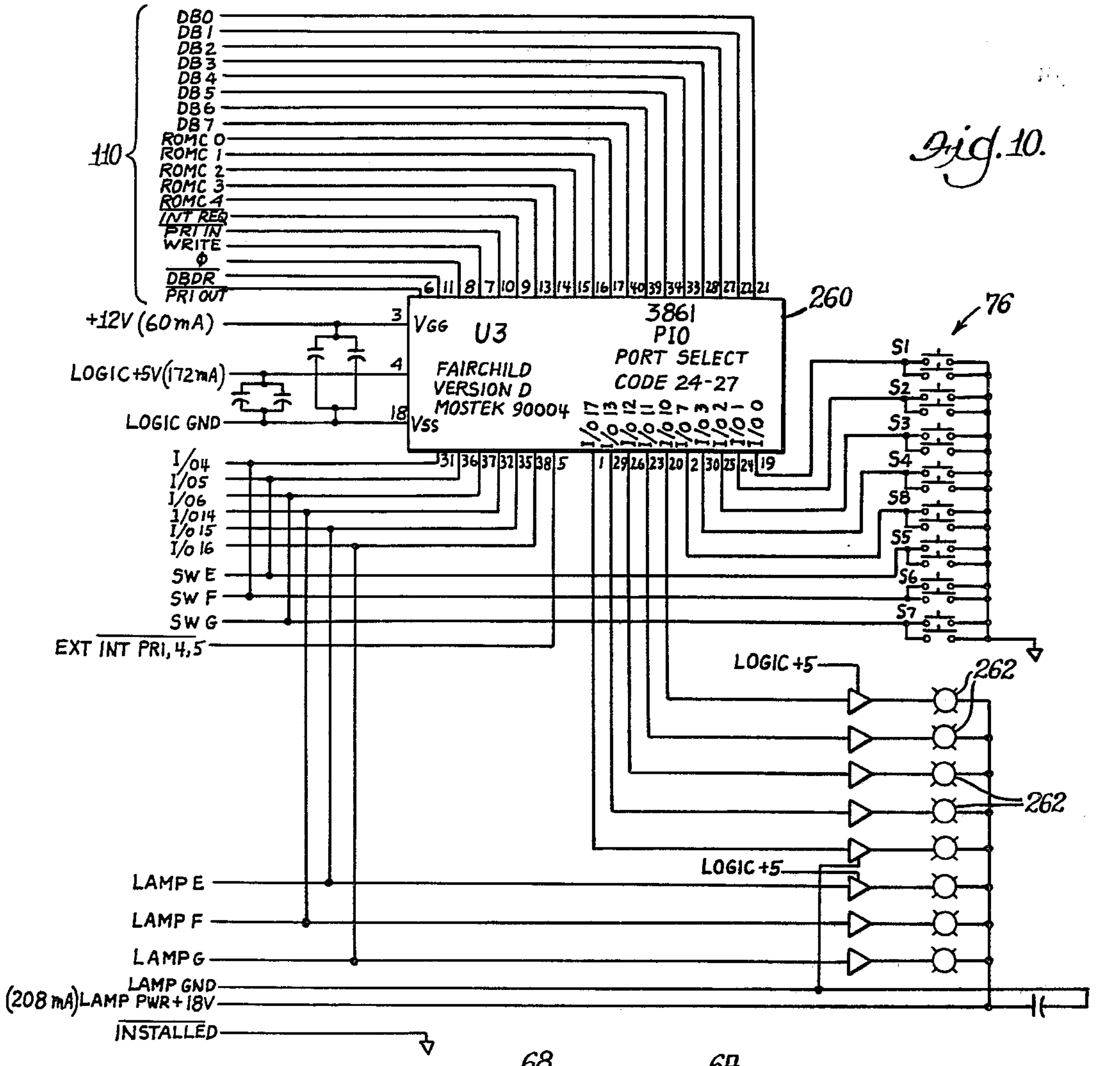
Figure 9:
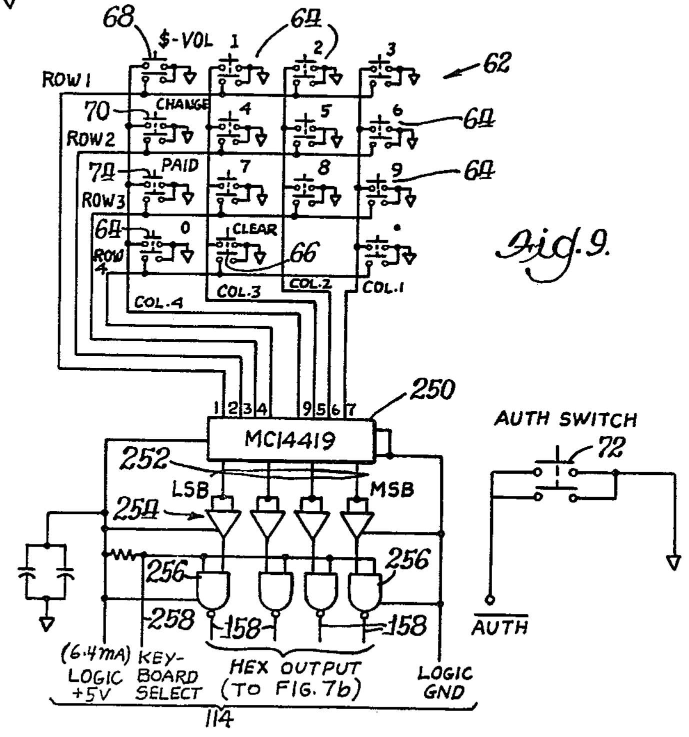
Figure 11A:
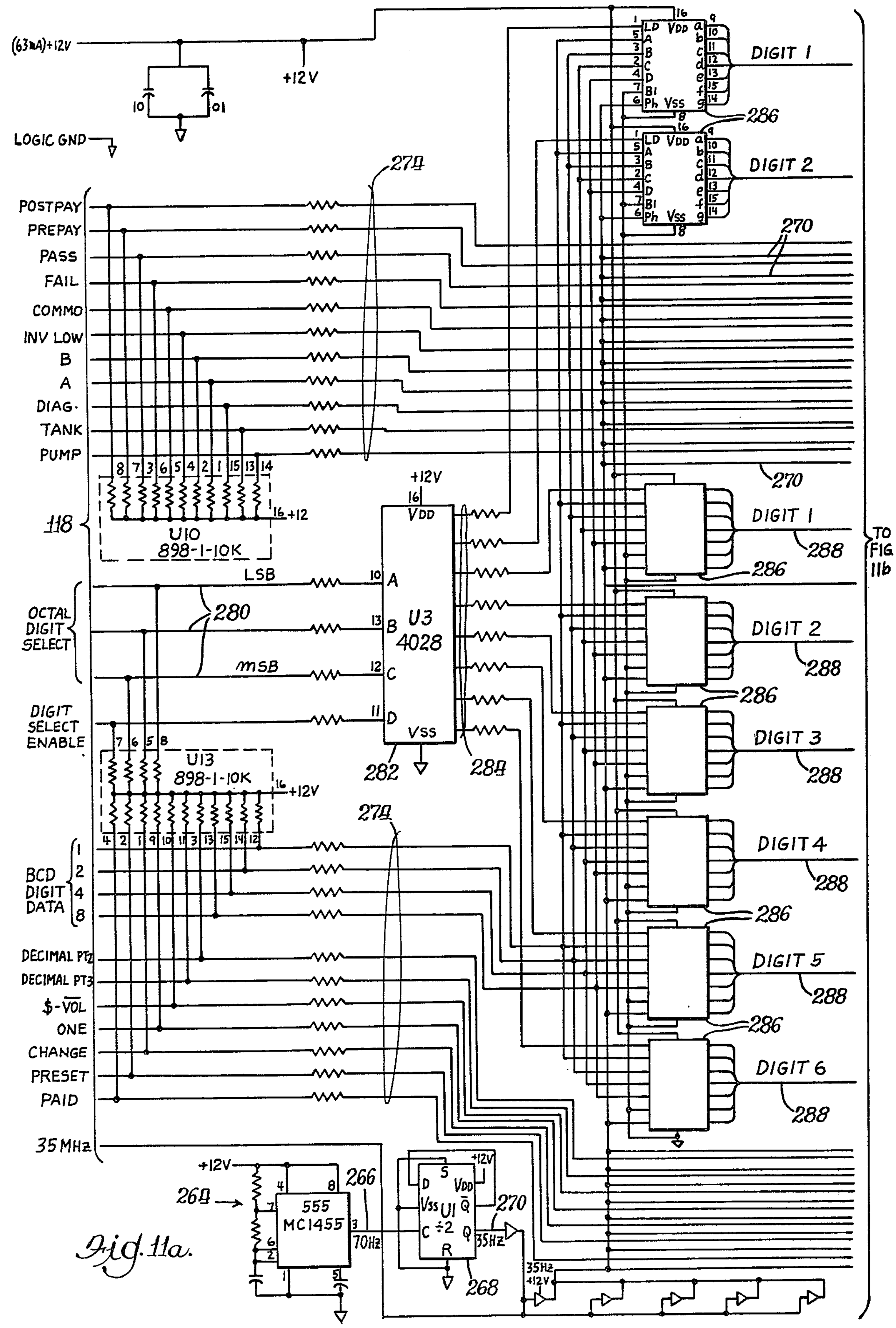
Figure 11B:
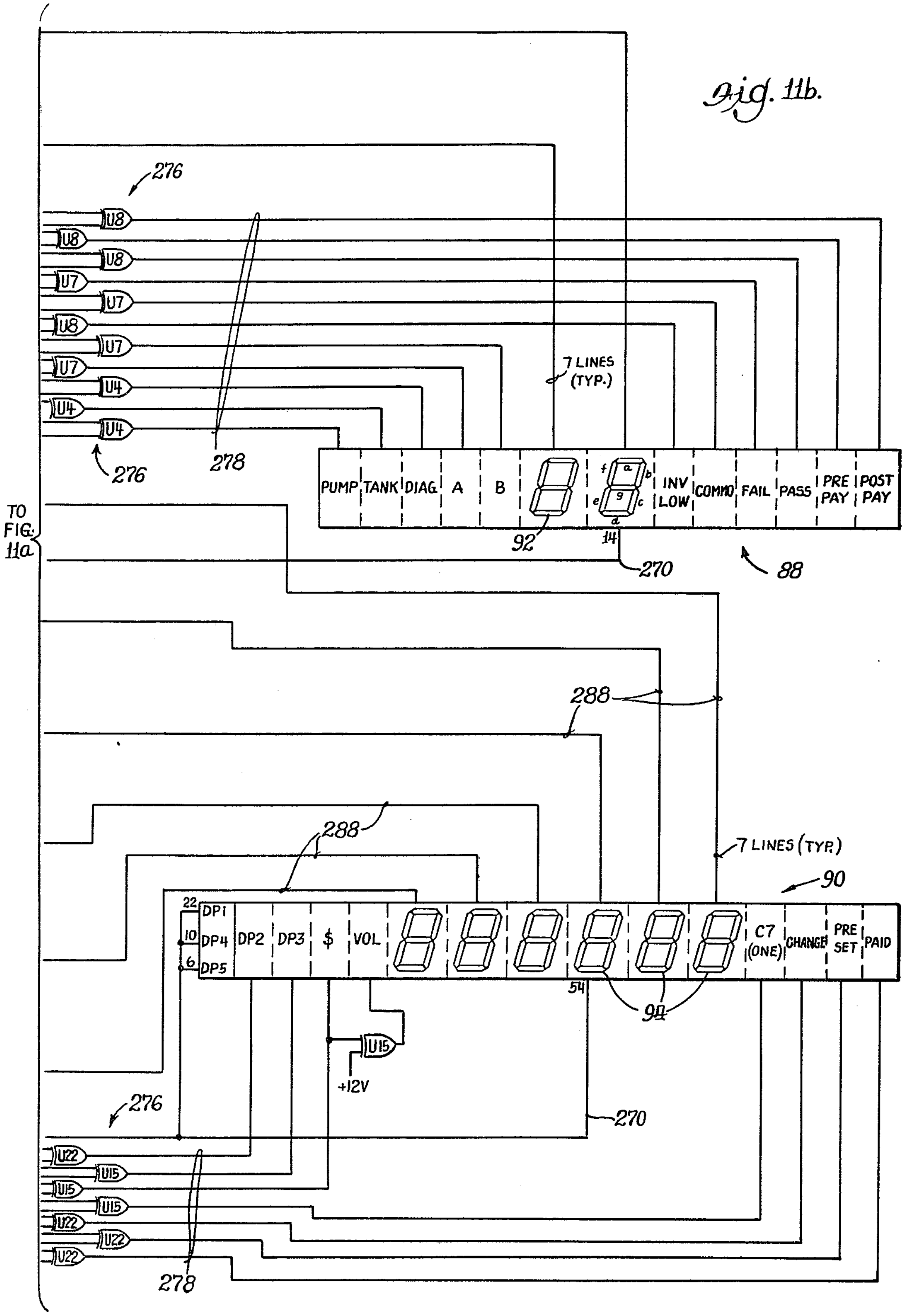
Figure 12:
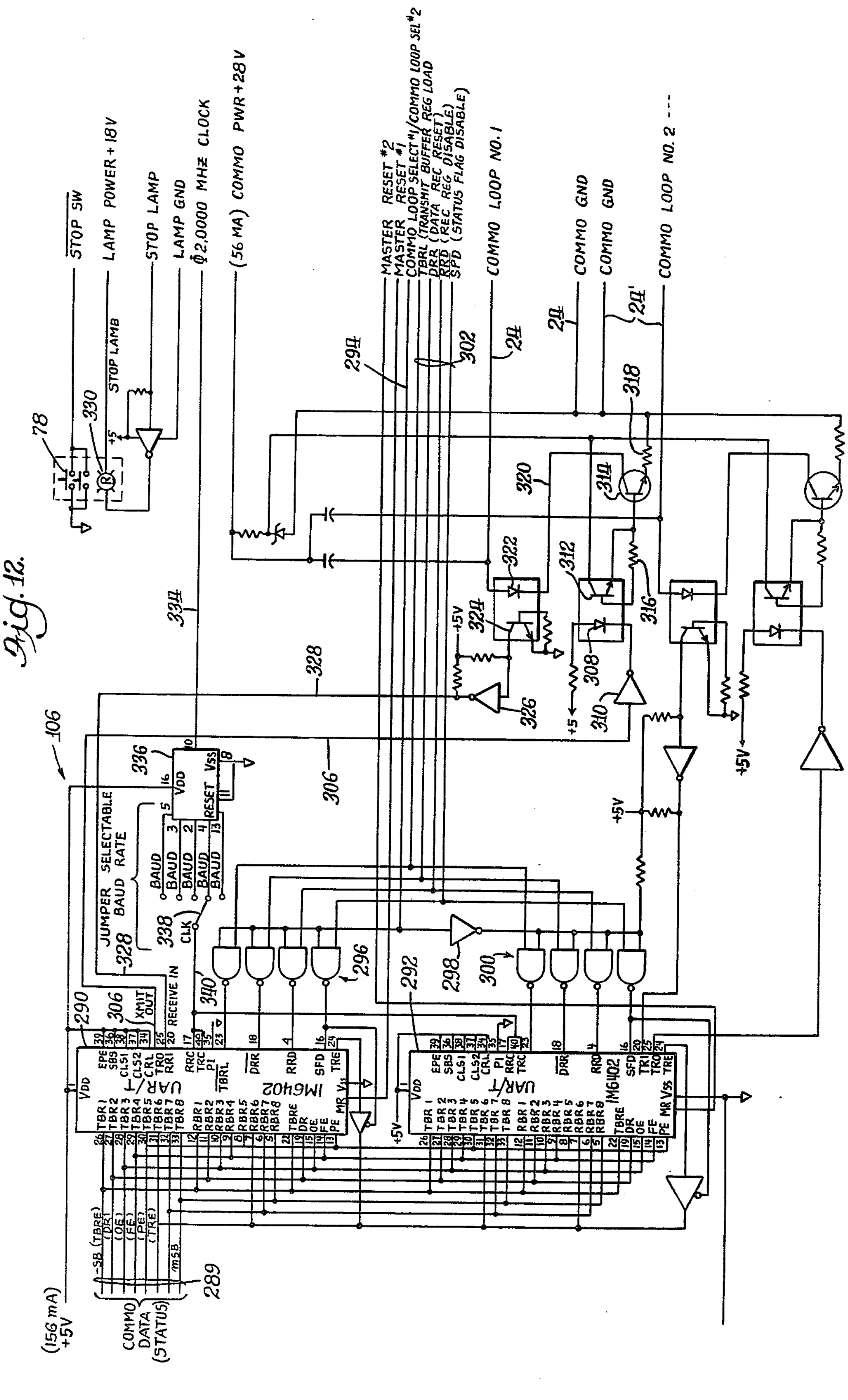
Figure 13A:
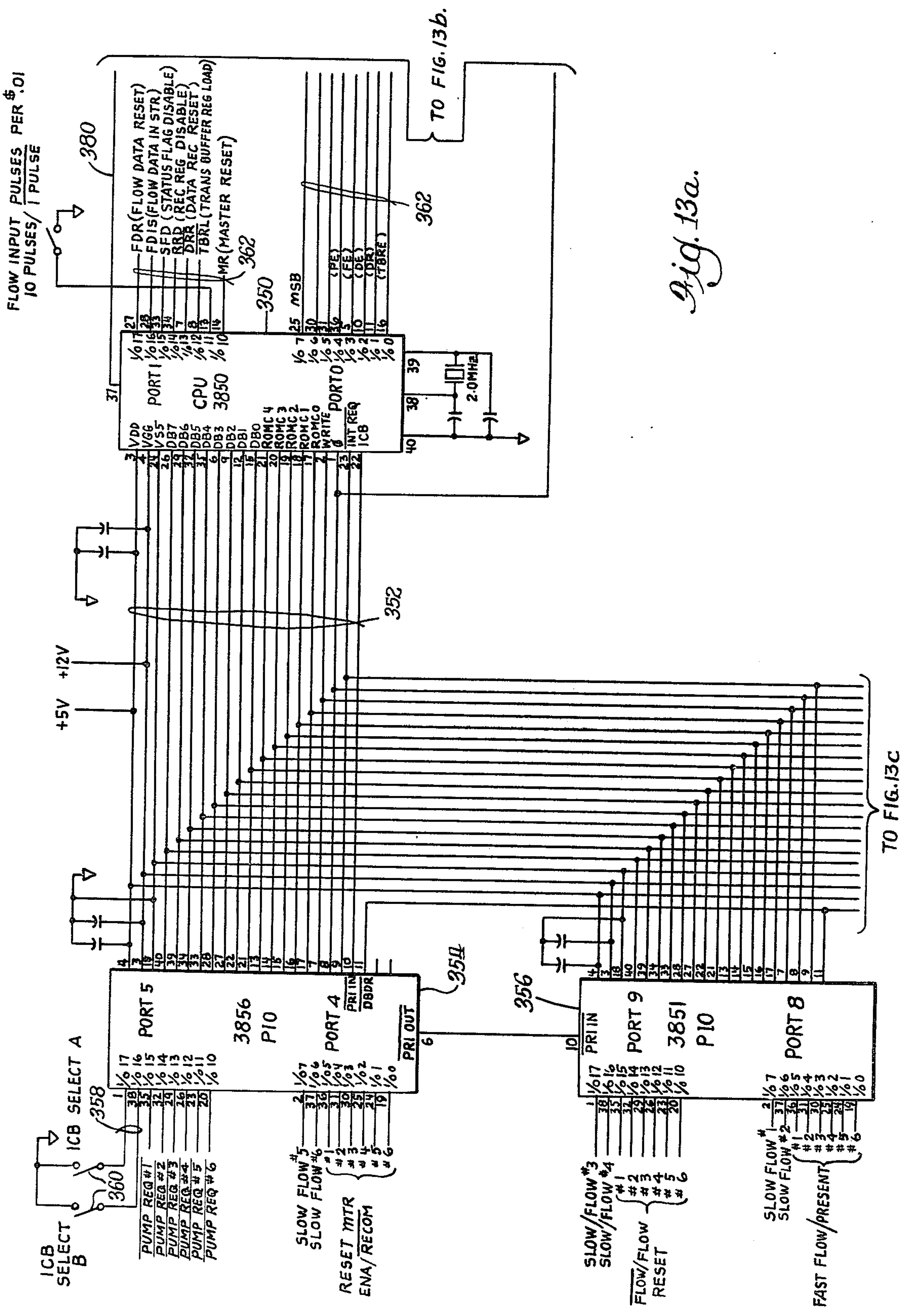
Figure 13C:
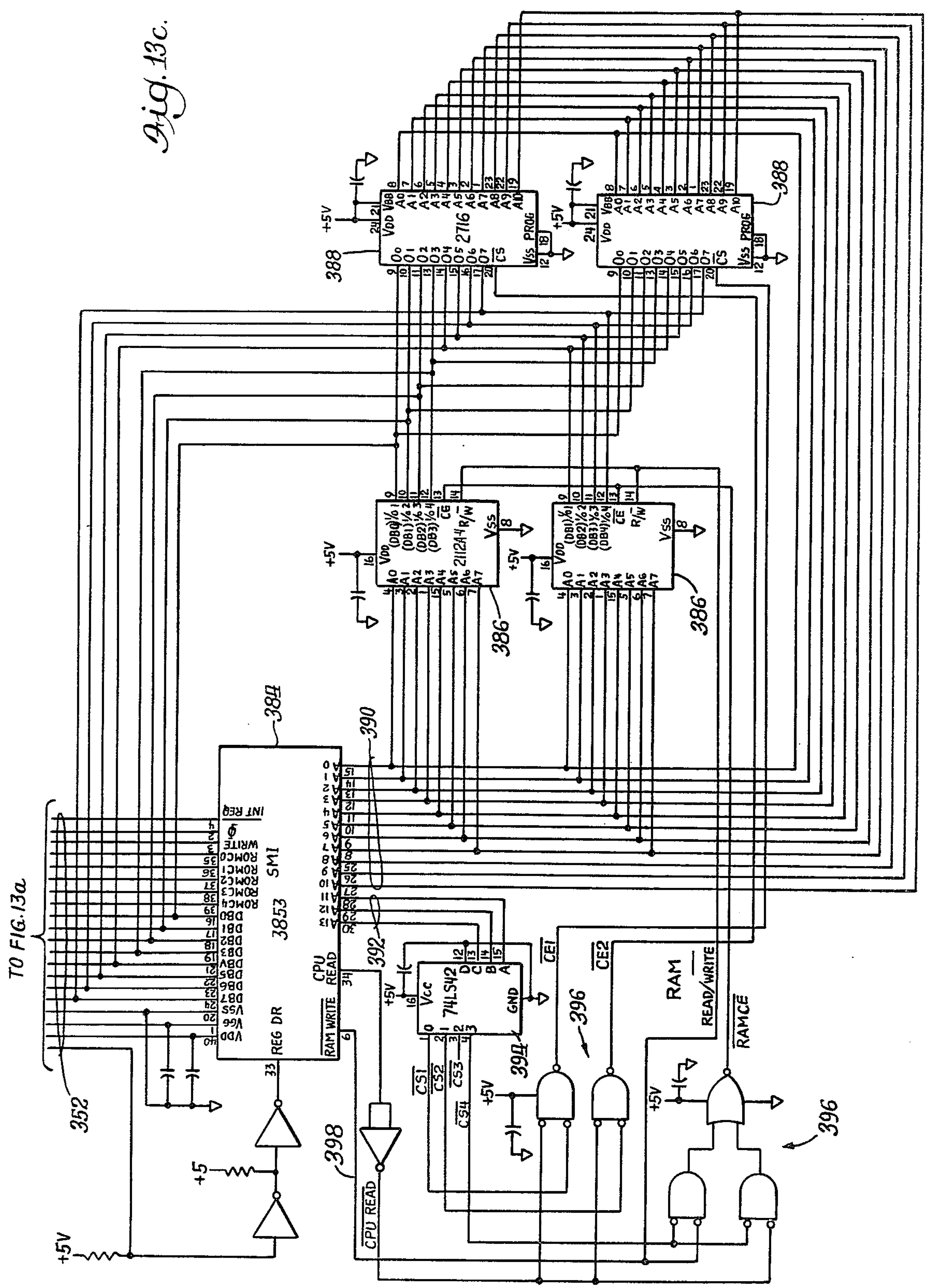
Figure 15A:
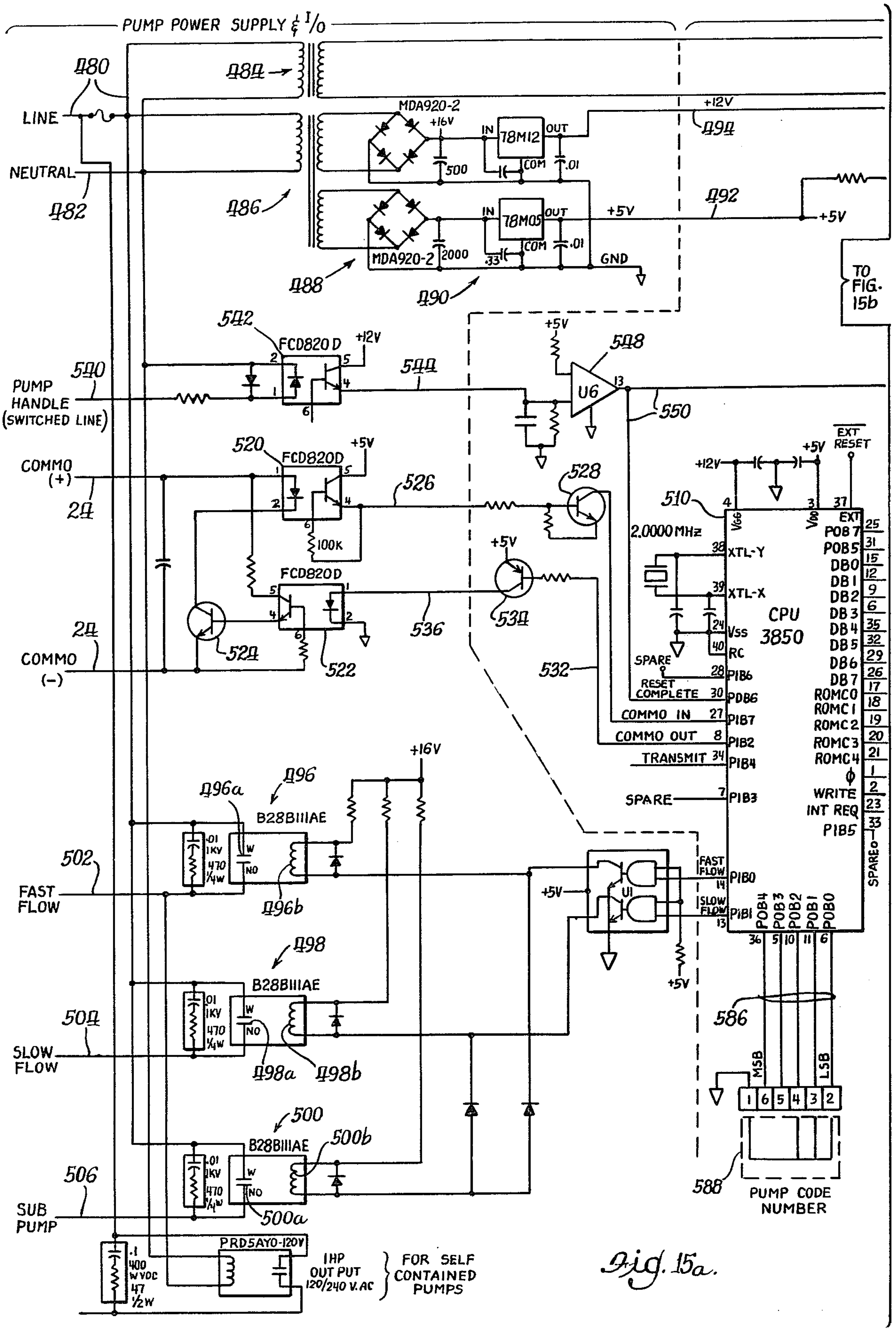
Figure 15B:
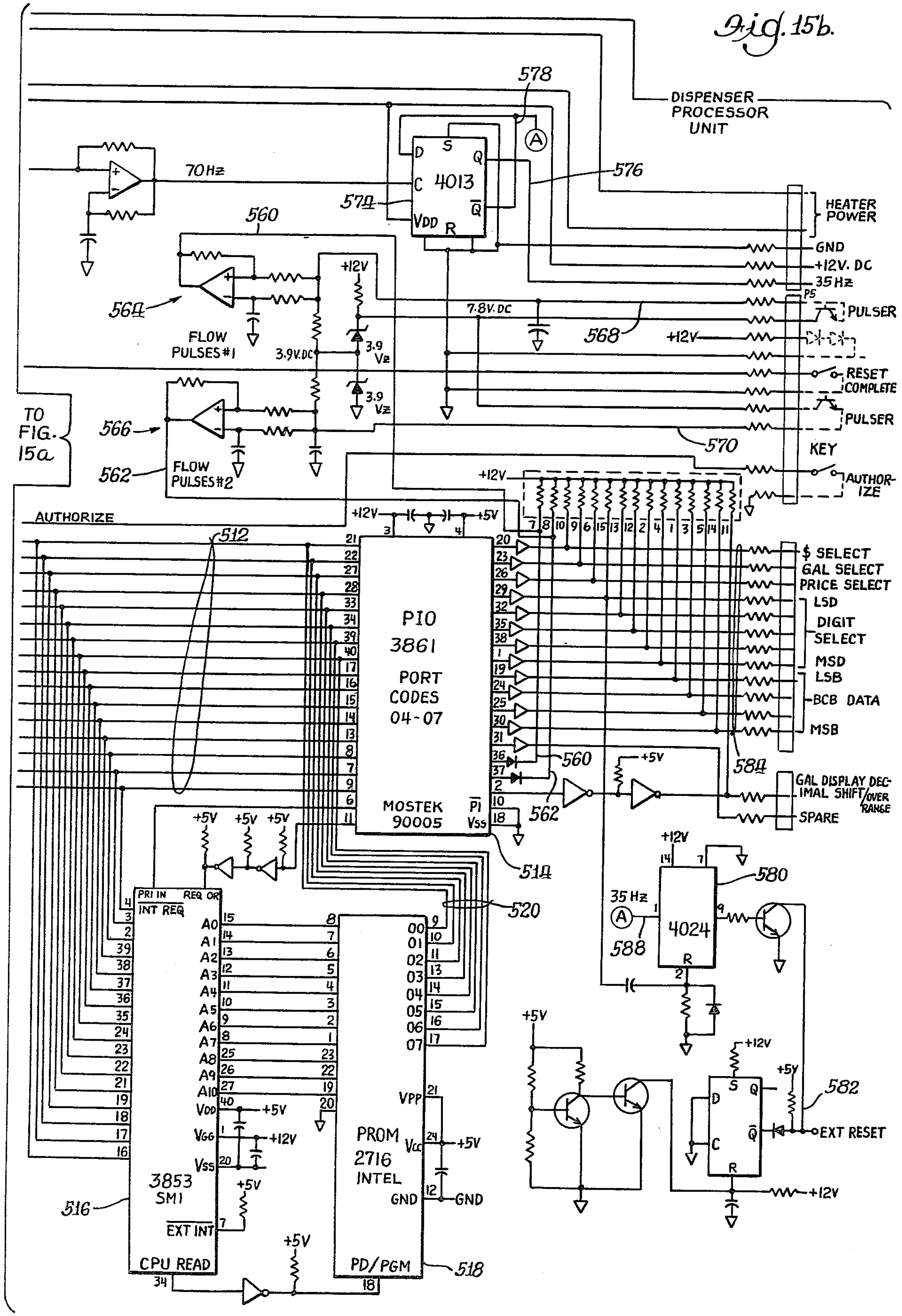
Figure 16:
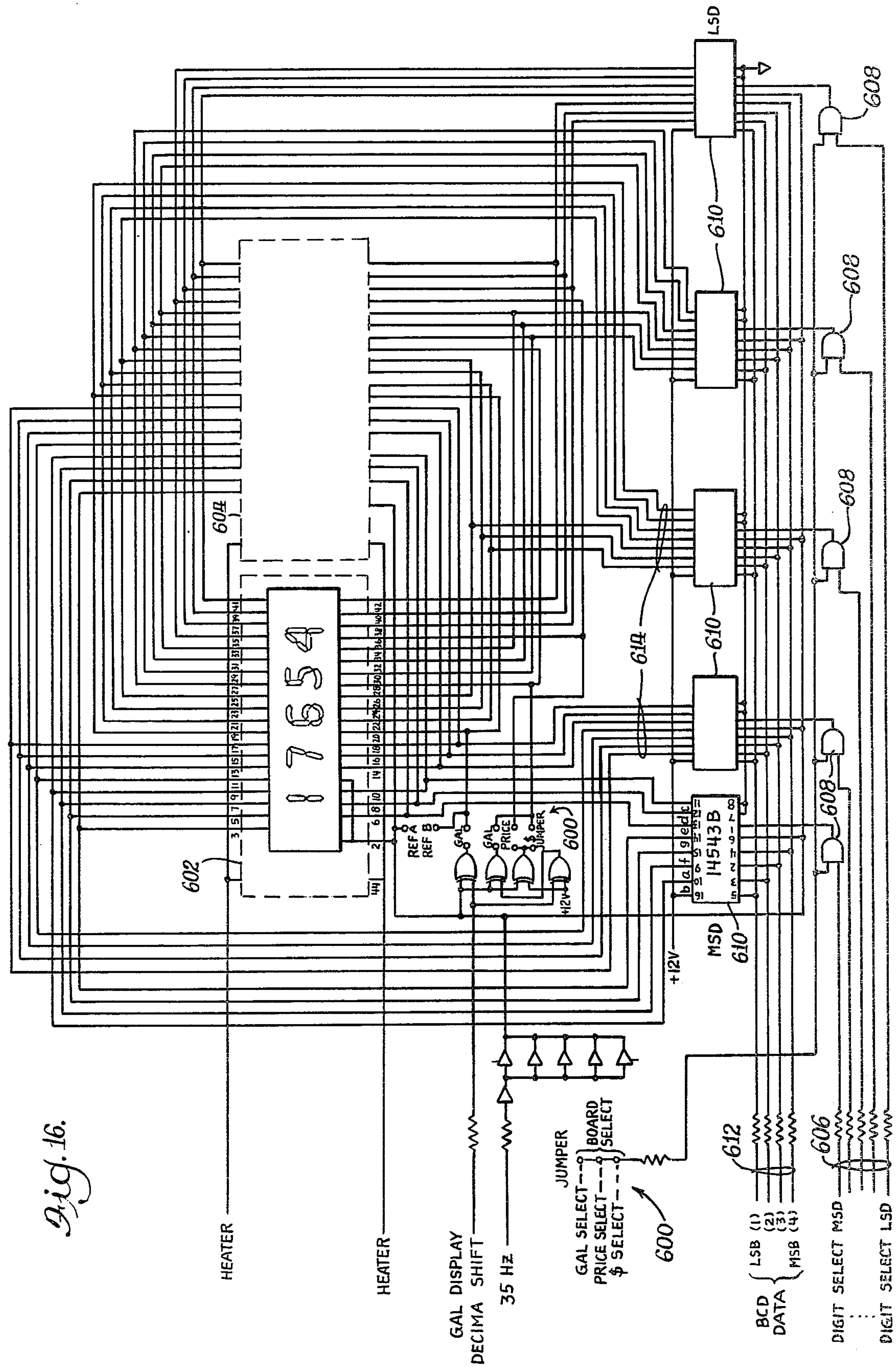

FIGS. 6*a* through 6*b* together form an electrical schematic diagram of the circuitry in the operator control console portion of the system embodying the present invention;

FIGS. 7*a* and 7*b* together comprise an electrical schematic diagram of the processing unit circuitry located in the operator control console portion of the system embodying the present invention;

FIGS. 8*a* and 8*b* together comprise an electrical schematic diagram of the external memory unit associated with the operator control console portion of the system embodying the present invention;

FIG. 9 is an electrical schematic diagram of the keyboard circuitry for the operator control console portion of the system embodying the present invention;

FIG. 10 is an electrical schematic diagram of the dispenser and tank selecting circuitry of the operator control console portion of the system embodying the present invention;

FIGS. 11*a* and 11*b* together comprise an electrical schematic diagram of the liquid crystal display circuitry of the operator control console portion of the system embodying the present invention;

FIG. 12 is an electrical schematic diagram of communication circuitry of the operator control console portion of the system embodying the present invention;

FIGS. 13*a*, 13*b* and 13*c* together comprise an electrical schematic circuit diagram of the interconnection box circuitry portion of the system embodying the present invention;

FIG. 14 is an electrical schematic diagram illustrating other of the interconnection box circuitry of the system embodying the present invention;

FIGS. 15*a* and 15*b* together comprise an electrical schematic circuit diagram of an alternative embodiment and illustrating the processing unit associated with the dispenser used in the system of the present invention; and, FIG. 16 is an electrical schematic diagram of dispenser liquid crystal display circuitry of the alternative embodiment of the system embodying the present invention.

Figure 1:
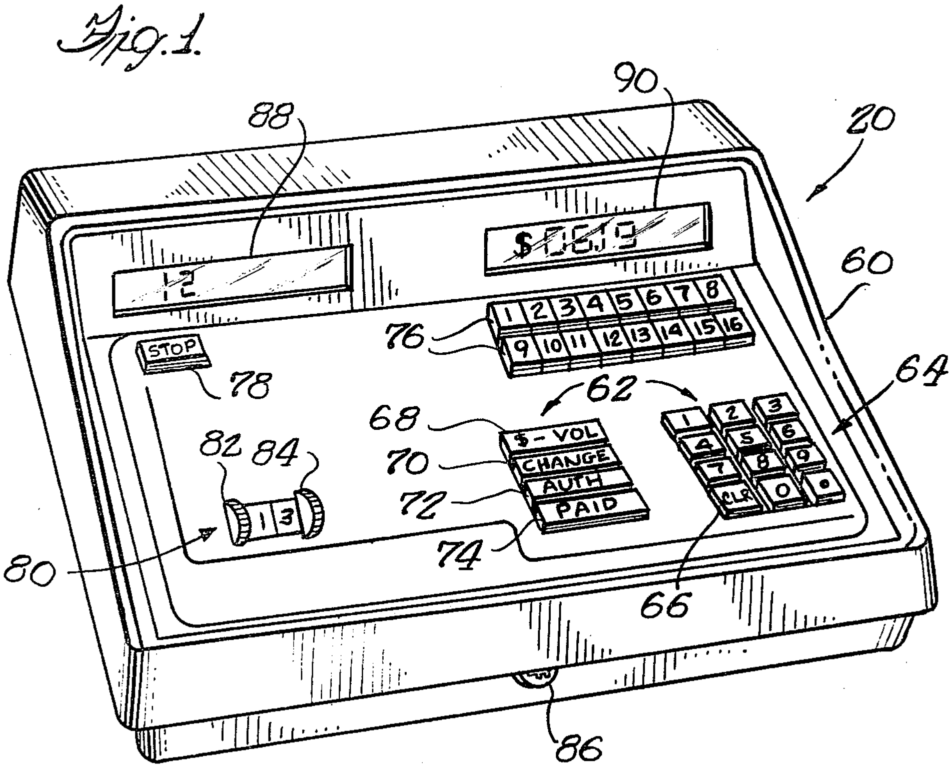
FIG. 1 is a perspective view of the operator control console portion of the system embodying the present invention.
Figure 4:
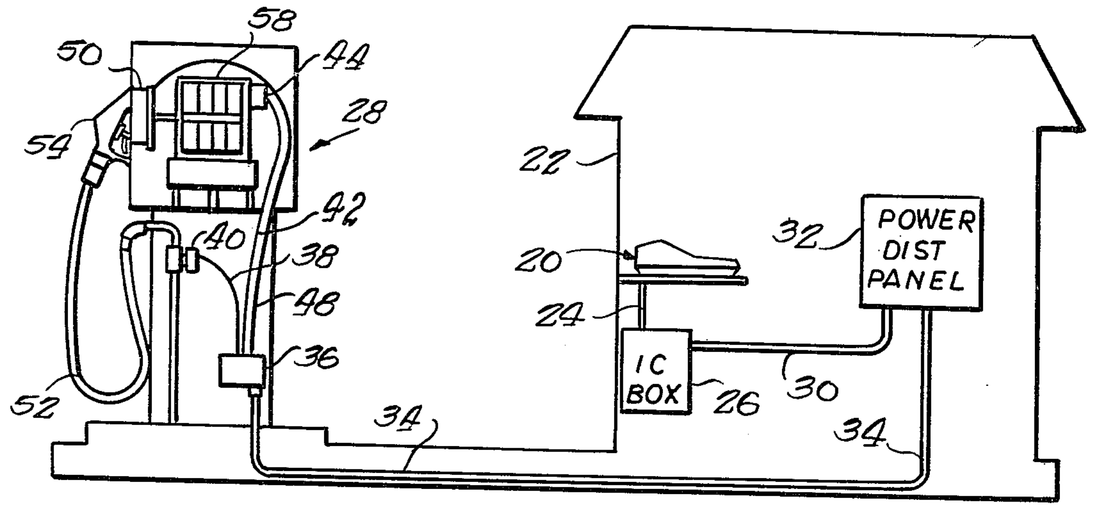
FIG. 4 is an idealized and simplified plan view of an installation of the system embodying the present invention.

Turning now to the drawings, and particularly FIGS. 1 and 4, the system embodying the present invention will be described in conjunction with its installation in a gasoline station where the operation of a number of gasoline dispensers or pumps are to be monitored and controlled, with the system of the present invention also providing a substantial number of other operational capabilities, such as providing inventory control and various totals for different operating periods as will be fully described herein. The system is shown to have an operating console 20 that is advantageously located within the station building 22 or in a smaller, preferably weather protected building near the dispensers if desired. The console 20 is preferably positioned so that the operator can visually observe the operation of all of the dispensers that are operably connected to the system for various and obvious reasons.

As is best shown in FIG. 4, the console 20 is located inside the station building 22 and is connected via two conductors 24 to one or more interconnection boxes 26 (only one of which is shown in FIG. 4) which contain circuitry that will be hereinafter described in detail. The use of two conductors 24 between the console and the interconnection box is advantageous in that it permits placement of the console at any convenient location within about 200 ft. of the interconnection box. The boxes 26 can be placed adjacent the power distribution panel 32 away from working and traffic areas and only the single two conductor cord needs to be extended to the console, in contrast to one or more multiconductor cables that are often used in some prior art systems. Each of the interconnection boxes 26 can be connected to a maximum of six dispensers 28 with each dispenser having nine separate conductors extending to it, which are shown in FIG. 4 to extend through a conduit 30 to a power distribution panel 32 and through conduit 34 to the island containing the dispenser 28. It is desirable to use existing conduits from the power distribution panel of a building that extend to the islands and thereby eliminate the disruption and expense of installing additional conduit from the interconnection box to the dispensers, although such may be required in the event the capacity of the existing conduit is insufficient to install the additional conductors. Moreover, in the event a prior self-service system had been installed, many if not all of the nine conductors may be present and available for use by the present system.

The conduit 34 terminates in a explosion-proof junction box 36 and has conductors 38 extending to a flow control valve means 40, conductors 42 extending to a pulse generating unit 44, such as is disclosed in the aforementioned U.S. Patent application of Hurley III and Krystek, entitled Rotating Shaft Pulse Generating Apparatus, which is assigned to the same assignee as the present invention. The pulse generating unit is operably connected to the metering apparatus such as a conventional mechanical computer and generates pulses corresponding to the quantity of fluid that is dispensed by the dispenser. Conductors 48 extend to a reset switch 50 having a conventional reset handle as is well known. The fluid product is dispensed through a flexible hose 52 and nozzle 54 which is preferably of the type which will automatically shut-off when the tank of an automobile or the like in which it is inserted becomes full.

In accordance with an alternative embodiment of the system of the present invention, an electronic display means 58 may be provided which supplies the same visual information on the dispenser display as the conventional mechanical computer. The electronic display means 58 offers significantly improved operation flexibility in that it can change the cost per volumetric unit, i.e., dollars per gallon, by the operator using the console 20 located in the station building. As will be hereinafter described, the inclusion of the electronic display means eliminates the need for the circuitry located in the interconnection box and requires only two conductor communication loops to be extended between the console 20 and the electronic display means 58 rather than the nine conductors, all of which will be described herein.

Figure 2:
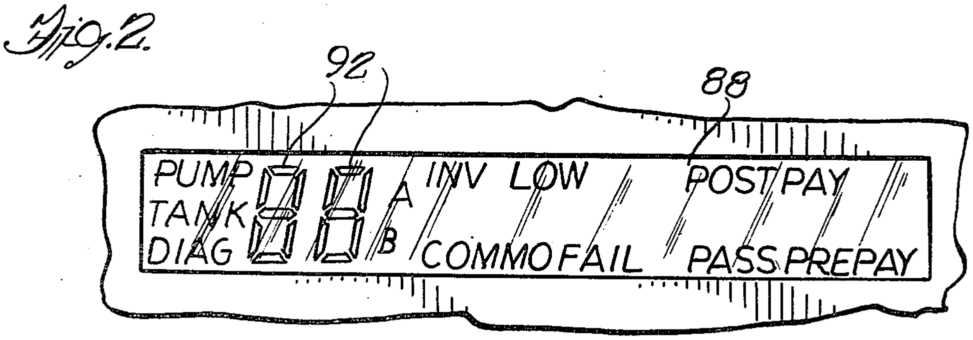
FIG. 2 is an enlarged view of one of the displays of the control console shown in FIG. 1.
Figure 3:
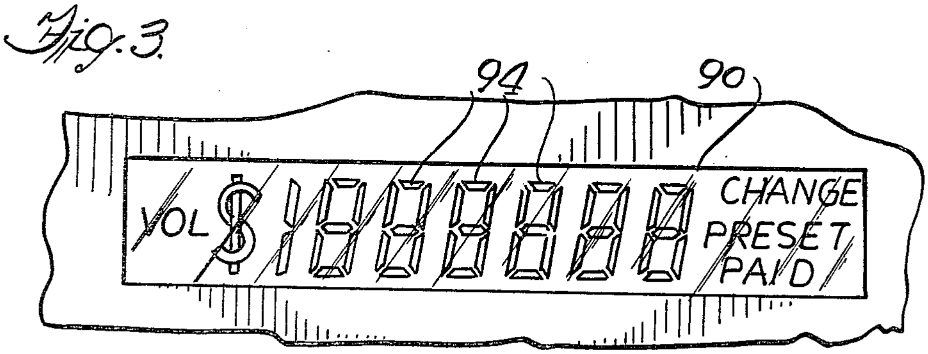
FIG. 3 is an enlarged view of another display of the console shown in FIG. 1.

With respect to the overall operation of the system embodying the present invention, it is controlled by an operator using the console 20 best shown in FIGS. 1–3. The console 20 has an outer housing 60, the upper flat working surface of which has a plurality of numeric and function switches 62 that the operator uses to control the system, including a cluster of numeric pushbutton switches 64 as well as a CLEAR switch 66. Other function switches include $-VOL switch 68, a CHANGE switch 70, an AUTHORIZE (AUTH) switch 72 and a PAID switch 74, all of which are operable to carry out certain transactional operations, depending upon the mode in which the system is set. At the upper right of the working surface are located a cluster of dispenser selecting switches 76, which in the illustration of FIG. 1 total 16 switches although the number of such dispenser pushbuttons will vary depending upon the particular installation in which the system is to be used. While the switches 76 are referred to as dispenser select switches, certain of them, namely switches 1 through 5 are used to identify respective storage tanks or reservoirs in certain operating modes as will become evident from the ensuing description. The system of the present invention is designed to utilize multiples of eight dispenser select pushbuttons 76, with a maximum of 24 pushbuttons being incorporated into a single system. A STOP pushbutton switch 78 is provided at the upper left corner of the working surface for placing the system in a STOP mode where certain transactions can be stopped, and a mode select switch 80 comprising two thumb wheel switches 82 and 84 enable the system to be configured in different operating modes. While the mode selecting switch 80 can be physically set to the number corresponding to any of the operating modes, the enabling of certain operating modes can be prohibited for the system, through the use of an operator or manager key lock switch 86 that is located in the lower front of the housing 60.

To provide the information to the operator regarding transactions that are being carried out, left and right electronic displays 88 and 90 are provided. As is best shown in FIG. 2, the left display 88 has two numerical indicators 92, together with a number of complete or abbreviated words that are selectively displayed during operation of the system. The words are generally self-explanatory, with DIAG meaning diagnostic, INV LOW meaning inventory low, COMMO FAIL meaning communication between the console and the interconnection box circuitry or one or more of the dispensers has failed. The right display 90 has a total of seven numerical displays 94, together with a dollar sign ($) indication and other complete or abbreviated words. It is preferred that each of the displays 88 and 90 be liquid crystal display units, since such liquid crystal displays require significantly lower power requirements than many other types of display units and this factor can become important if the system is operating by a battery backup system in the event the AC power is interrupted. The liquid crystal display also provides good visual contrast in high ambient light levels and can be designed to easily provide the words and the large numerical indicators shown in FIGS. 1 through 3.

The system is capable of being operated in several operating modes, as determined by the mode select switch 80 together with the key switch 86. When the mode select switch 80 is set in a certain operating mode (mode 20), the key lock switch can selectively permit the enabling or disabling of other modes, and thereby control the manner in which the system can be operated without the use of the key lock switch 86. The system described herein is capable of operation in 20 distinct modes, which can broadly be categorized as normal operation, modes wherein the cost and quantity totals for various periods can be obtained, e.g., shift, day, extended period and grand totals, and other modes wherein other operating functions can be selected or set, as will be hereinafter described. While the particular mode number for an operating mode can easily be changed, the particular number of the operating modes described herein are included herein for the sake of ease of description and for correlation to certain program listings that are included in Appendix A. The modes will be described generally in numerical order.

To operate the system in a normal manner wherein fluid product is sold, the mode select switch 80 is set to the normal operating mode, designated mode 00, wherein operation of the dispensers can be done either in a prepay or postpay type of transaction, with each dispenser (or pump) being capable of being specified as a postpay or prepay dispenser. The specifying of each dispenser can be altered through the use of mode 16 as will be hereinafter explained. Thus, with respect to the normal operation of a dispenser in a postpay operation wherein the customer dispenses product such as gasoline and then pays for the amount that he has taken, the following series of events occur. When the customer picks up the nozzle 54 and operates the reset handle of reset switch 50 to set it to an on position, the console 20 issues a beep tone and a light preferably located inside the dispenser select pushbutton 76 corresponding to the dispenser the customer is operating flashes slowly, indicating that the operator must authorize flow. The operator then presses the flashing dispenser select pushbutton 76 and the AUTHORIZE pushbutton 72 to authorize flow. At this time, the dispenser pushbutton light is steadily on, indicating that the pump is in use and that flow is authorized. After the customer has dispensed the product and turns the reset handle to its off position and hangs up the nozzle, the console again issues a beep tone and the pump select button flashes rapidly indicating that the customer is through dispensing. The operator then depresses the pump select button and the right display 90 displays the dollar amount of the sale. The operator then depresses the $-VOL pushbutton 68, the display 90 will then indicate the gallon amount of the sale. It should also be appreciated that when the dollar amount of the transaction is illustrated, the dollar sign ($) of the display 90 will be displayed and, similarly, when the volume is being displayed, the word VOL will appear and the dollar sign ($) will disappear. When the amount is collected from the customer, the operator then depresses the PAID pushbutton 74 and the dispenser select pushbutton then stops flashing, the dollar value and gallon amounts of the transaction are then added to the internal totals and the inventory balance is reduced by the gallon amount sold and the particular dispenser is ready for use by the next customer. It should be appreciated that the system described herein is one in which the cost of the product is in dollars and the quantities are in gallons. In the event that the system is installed in a location where cost is in other currencies and if the volume is in metric units, the displays can be accordingly designed to reflect the proper units. As will be described, the internal circuitry may be changed from the English to metric units by a switch on the console.

In the prepay type of operation, the following events occur in a typical sale transaction. The customer tells the operator the dollar or gallon amount of the sale desired and pays the operator. The operator then depresses the appropriate dispenser select pushbutton, selects the dollar or gallon prepay limit by depressing the $-VOL button 68, enters the amount desired on the numeric keyboard 64 and then depresses the PAID pushbutton 74 which causes the dollar and gallon amounts to be added to the totalizers at that time and causes its internal lamp to be continuously illuminated, indicating that flow is authorized at that dispenser. The customer then picks up the nozzle 54 turns the reset switch 50 to the on position and dispenses product. If the customer attempted to dispense product before paying, no flow would occur. After dispensing is complete, however, the customer then turns the reset handle to off position and hangs up the nozzle which, if he has taken the amount paid for, will cause the dispenser select pushbutton internal lamp to go off and the dispenser will be ready for use by another customer.

However, if the customer has not taken the amount paid for, the console issues a beep tone and the dispenser select pushbutton will rapidly flash, indicating that dispensing is complete and that change is due to the customer. The operator then depresses the dispenser select button and the dollar amount of the product that has been dispensed will be shown on the display 90. The operator may depress the $-VOL pushbutton to view the gallon amount of the sale on the right display if desired. If the latter is done, the operator then again depresses the $-VOL pushbutton to display the dollar amount of the transaction on the display 90. Subsequent depression of the CHANGE pushbutton results in the dollar amount of change that is due the customer being displayed. When the operator has paid out the change amount to the customer, he can then depress the PAID pushbutton 74 and the dispenser select button internal lamp will go off indicating that the transaction is complete. The dollar and gallon totalizers are then reduced by the amount of change paid out and of the gallons that were not taken and the dispenser is ready for the next customer.

When the system is set in the mode 01, it displays totals for the current operating shift, such as a typical eight hour work shift, for example. When the mode select switch 80 is set in mode 01, the console displays the total dollar amount of sale for all products for the current shift on display 90. By depressing the $-VOL pushbutton, the total gallon amount for all products dispensed is displayed. By depressing the dispenser select pushbutton numbered 1 through 5, the dollar amounts of sales for the supply tanks or product supply reservoirs will be displayed. In this mode of operation, the display 88 will have the word TANK appear and the word PUMP will disappear so that the numbers 92 will correspond to the appropriate tank 1 through 5. While five tanks are incorporated in the present system, it should be appreciated that more tanks may be present in some service stations in which case the system can be modified to reflect this situation. By depressing the $-VOL pushbutton, the display 90 will cause the gallon amount to be displayed, rather than the dollar amount of the sales. By depressing the CLEAR pushbutton 66 and the AUTHORIZE pushbutton 72 simultaneously, the end of the shift will be marked and the shift totals will be stored as the previous shift totals and the current shift totals are cleared. Moreover, the first previous shift totals are shifted to the second previous shift totals and, similarly, the second previous shift totals are transferred to the third previous shift totals. In the event there are postpay transactions that have not been completed, i.e., they have not been paid by the customer at the end of the shift, these transactions are carried forward into the next shift and both the dollar amount and gallons are carried forward. With respect to prepay transactions that have not been completed but which have been added to the current shift are carried forward and any change amounts that are due in those prepay transactions that overlap a shift are deducted from the totals for the next shift, since the change must be paid out from the next shift operator's cash drawer.

When the mode select switch is set in modes 02, 03 and 04, the first previous, second previous and third previous shift totals are displayed on the right display 90. The display first displays the total dollar amount of sale of all product for the respective shift, and upon depressing the $-VOL pushbutton causes the total gallon amount for that shift to be displayed. Similarly, depressing the dispenser select pushbuttons 1 through 5 will display the dollar amounts of product sold from the respective tanks 1 through 5 and also the gallon amount, when the $-VOL pushbutton is depressed.

When the mode selecting switch 80 is set to mode 05, the current day totals are provided on display 90, and upon depressing the $-VOL pushbutton displays the total gallon amount of the product that has been sold. Depressing display select pushbuttons 1 through 5 causes the dollar amount of sales for the respective tanks 1 through 5 to be displayed, and upon depressing the $-VOL pushbutton causes the gallon amount to be displayed. When the CLEAR and AUTHORIZE pushbuttons are simultaneously depressed, the end of the day is marked which causes the current day totals to be stored as previous day totals, and clears the current day totals to zero. When the CLEAR and AUTHORIZE buttons are simultaneously depressed, any postpay transactions that are not yet completed will be carried forward into the next day and any prepay transactions not yet completed will have been added into the current day and are not carried forward. However, change amounts that are due customers in prepay transactions which overlap a day, i.e., they are paid before the marking of the end of the day but the transaction was finished after the end of the day, are deducted from the totals for the next day, since the change must be paid out from the next day operator's cash drawer.

When the mode selecting switch 80 is set in mode 06, the console displays the total dollar amount of sale for all products for the previous day, as well as the total gallon amount upon pressing the $-VOL pushbutton. Similarly, depressing the dispenser select pushbuttons 76 numbered 1 through 5 display the dollar amounts of sale from respective tanks 1 through 5, as well as the respective gallon amounts upon pressing of the $-VOL pushbutton.

To display the current period totals, the mode selecting switch 80 is set in mode 07 which results in the total dollar amount of sale for all products of the current period to be displayed in the display 90. By depressing the $-VOL pushbutton, the total gallon amount for the product will be displayed. Similarly, depressing the dispenser select pushbutton numbered 1 through 5, respectively, causes the dollar amount of sales for the respective tanks 1 through 5 to be displayed and depressing the $-VOL pushbutton results in the gallon amount being displayed. By simultaneously depressing the CLEAR and AUTHORIZE pushbuttons, the end of the current period will be marked, and the current period totals will be transferred to the previous period totals and the current period totals will be cleared to zero. Any incomplete postpay and prepay transactions will be handled in a manner substantially similar to that described with respect to the end of the shift and end of the day marking.

By setting the mode select switch to mode 08, the previous period totals will be displayed in the same manner as has been described with respect to the current period totals of mode 07. Similarly, when the mode select switch is set for mode 09, grand totals will be displayed.

To set as well as display tank inventory levels and to enter the receipt of product that has been added to the tanks or reservoirs, the mode select switch 80 is set in mode 10. Upon selecting mode 10, the light associated with the dispenser select pushbutton corresponding to the tank number that has a low inventory limit will be lighted, e.g., if tank 2 is low, then dispenser select pushbutton No. 2 will be lighted, and the message INV LOW will be displayed by the display 88. (The INV LOW message will also appear when the system is operating in mode 00 as well, if a tank is below the low inventory limit.) By depressing a dispenser select pushbutton 1 through 5, the inventory level in gallons for the selected tank or reservoir will be displayed on display 90. To enter a new tank inventory amount, the appropriate tank is selected by depressing the appropriate dispenser select pushbutton and the new inventory amount is entered by use of the numeric keyboard 64 followed by depressing the AUTHORIZE pushbutton 72. The new inventory amount will then be shown in the display 90. After the AUTHORIZE pushbutton is depressed, the word PRESET appears in the display 90 for about one second to verify that this is a tank inventory entry.

To add a metered product receipt to the tank inventory, the tank is selected by depressing the appropriate dispenser select pushbutton 76, and the amount of the metered product that is received is entered on the numeric keyboard 64, followed by depressing the PAID button. The new inventory amount will be shown in the right display which, after the PAID pushbutton is depressed, causes the word PAID to appear in the display 90 for one second to verify that this has been added to the tank or reservoir.

When the mode select switch 80 is set in mode 11, the low level inventory limits can be set as well as displayed. If any of the tanks 1 through 5 are below the low inventory limit that has been set for that tank, the dispenser select pushbutton corresponding to the tank number will be lighted. Depressing the dispenser select pushbutton 1 through 5 will cause the respective low inventory limits in gallons for each tank to be displayed on display 90 with the particular tank selected being shown on display 88. To enter a new low inventory limit, the tank for which the limit is to be set is selected by depressing the appropriate dispenser select pushbutton, a new inventory limit can be entered through the numeric keyboard 64 followed by depressing of the AUTHORIZATION button. The new limit will be displayed in the right display 90, and when the AUTHORIZATION button is depressed, the word PRESET will appear on the display 90 for one second to verify that the new inventory limit has been entered.

Dispensers can be assigned to the proper tanks when mode 12 is set on the mode selecting switch, to reflect the actual physical connection between the fluid dispensers and the tanks or reservoirs from which they dispense product. To assign dispensers to a tank, the operator depresses one of pushbuttons 1 through 5 on the numeric keyboard 64 to select a tank and the selected tank is displayed by the left display 88 and the dispenser select pushbutton 76 light for those dispensers that are assigned to the selected tank. Depressing additional unlighted dispenser select pushbuttons assigns those dispensers to the displayed tank and causes the console to light the dispenser select pushbutton. It should be noted that all dispensers are initially assigned to tank No. 1 and that dispensers are deleted from one tank by assigning them to another. A dispenser with a price set is automatically assigned to tank No. 1 and a dispenser without any price set cannot be assigned to a tank.

To set the price for each dispenser, the mode select switch 80 is set to mode 13 which enables a dispenser to be selected by depressing the appropriate dispenser select pushbutton and this causes the price assigned to that dispenser to appear on display 90. To enter a price, the dispenser is selected by depressing the appropriate dispenser select pushbutton and the price to be entered is set using the numeric keyboard 64 (including the decimal point) followed by depressing of the AUTHORIZATION button. The price set is then shown on the right display 90 and the corresponding dispenser select pushbutton lamp will turn on if a price had not been previously set for it. If the price was set previously, the light associated with the appropriate dispenser select pushbutton will go off and then back on, indicating that the price has been changed. In the event that the previously mentioned electronic display 58 at the dispenser is incorporated into the system, as opposed to a mechanical computer device, by setting the price for a dispenser, the price will be set in the remote display.

The system of the present invention may include a modification to accommodate what is described as a stacking function. During normal operation as previously described with respect to mode 00, the use of a stacking option would allow the operator to permit a second customer to use the dispenser immediately after the first customer has completed dispensing product, but before the customer has paid for the product. In the event the system does incorporate the stacking feature, then A and B pushbuttons 76 for each dispenser will be provided in the cluster of dispenser select switches. With 24 pushbuttons 76 provided in the console, the incorporate of the stacking feature will permit operation of 12 dispensers. The operator can depress the unused dispenser select pushbutton, together with the AUTHORIZE pushbutton for the second customer and permit the second customer to begin dispensing. The stacking feature permits more expeditious use of the dispensers during operation of the system and does not require the completion of a sale before the next transaction is started by the same dispenser.

By setting the mode select switch 80 to mode 15, the stacking function can be selectively enabled or disabled for all pumps. If stacking is disabled, then the letter A located on display 88 will be displayed and if stacking is enabled, the letter B will be displayed. To enable the stacking function, the AUTHORIZE pushbutton is depressed which enables all dispensers served by the console 20 to stack transactions. Stacking cannot be selectively enabled for individual dispensers. To disable the stacking function, the PAID pushbutton 74 is depressed.

As previously mentioned, the normal operation of the dispensers may be used in either a prepay or postpay type of operation and either type can be selected for each dispenser. By setting the mode select switch to mode 16, the operator can specify which of these types of operations will be carried out. The dispenser select pushbuttons will have their associated light illuminated when the dispenser is in a prepay operation. If a dispenser is to be set into a prepay type of operation from a postpay type of operation, the dispenser select pushbutton can be depressed and the pushbutton will be lighted. If a lighted dispenser select pushbutton is depressed, it will set the dispenser to postpay operation and its internal lamp will be extinguished. When the mode select switch 80 is switched out of mode 16, the individual dispensers will be held in their selected prepay or postpay operating states.

The system can also be used in an automatic or a manual authorize mode of operation, and the changing from automatic to manual is achieved when the mode select switch 80 is placed in mode 17. When this is done, the operator can select manual authorization of flow on each transaction by depressing the PAID pushbutton 74 or can select automatic authorization of flow on each transaction by depressing the AUTHORIZE pushbutton. When automatic authorization has been selected, the word PASS will appear on display 88 and when manual authorization has been selected, the word FAIL will appear on the same display. In the postpay type of operation, automatic authorization eliminates the issuance of a beep tone and the flashing of the dispenser select pushbutton, as well as the necessity for the operator to depress the dispenser select pushbutton and the AUTHORIZE pushbutton to authorize flow. The automatic authorization permits the attendant to the outside of the station and collect money from the customers if desired, and does not require the attandant to come into the station and depress the AUTHORIZE pushbutton for each new transaction. It should be noted that automatic or manual authorization applies to the entire system and cannot be selectively used for individual dispensers.

A system embodying the present invention can also be used to set a rationing limit by setting the mode select switch to mode 18 which, when done, displays the maximum amount in dollars or gallons in display 90 that the customer is permitted to dispense. The maximum amount may be changed by selecting either dollars or gallons to be displayed using the $-VOL pushbutton, by entering the limit amount through the numeric keyboard 64 and depressing the AUTHORIZE pushbutton to set the limit. The right display 90 shows the limit amount entered whether the limit is a dollar limit or a gallon limit. When the AUTHORIZE pushbutton is depressed, the word PRESET will occur on display 90 for one second to verify the entry of the rationing limit. The rationing limit that is set applies to all dispensers in the system and cannot be applied to individual dispensers. If the rationing limit is to be eliminated, setting it to zero will disable the rationing limit check.

When the mode select switch 80 is set in mode 19, the slow down volume for normal prepay operation can be set. When the mode 19 is initially selected, the slow down volume is displayed on display 90 and is normally set at 0.2 gallons, but may be changed to whatever is considered appropriate. If the slow down volume is too small, the dispenser may over-shoot the prepaid amount that has been paid by the customer. The slow down volume may be changed by entering the desired slow down volume through the use of the numeric keyboard 64 followed by depressing the AUTHORIZE pushbutton. The display 90 will then show the new slow down volume. When the AUTHORIZE pushbutton is depressed, the word PRESET will appear on the display 90 for one second to verify the entry of the slow down volume. The slow down volume applies to all dispensers in the system.

It should be appreciated that certain types of transactions may desirably be prohibited through normal use of the console 20 by any of the attendants that are on duty. For example, the owner or manager of the station may not wish to permit attendants to change the price of the product, or display certain of the totals or set inventory levels or the like. By setting the mode selecting switch to mode 20, virtually all of the modes can be made at least partially inoperable unless the key for the key lock switch 86 is inserted and activated. More specifically, when the key is inserted into the key lock switch 86, mode 20 becomes operable and permits the manager to select any of the various modes which he desires to either enable or at least partially disable. Thus, by authorizing access to certain modes, those modes can be used without inserting the key and activating the key lock switch 86. To authorize access to modes 1 through 19, the key switch is activated when the mode select switch is in mode 20 and through the use of the numeric keyboard 64, any of the modes 1 through 19 can be permitted access by entering the number of a mode and depressing the AUTHORIZE pushbutton which then permits access to that mode without the key. When the AUTHORIZE pushbutton is depressed for a mode, the word PASS will appear in display 88 to indicate that operator access is permitted without the key. The manager may also restrict access to modes 1 through 19 by entering the number of the mode using the numerical keyboard 64 and depressing the PAID pushbutton 74 which then requires the key be present in key lock switch 86 to permit access to that mode. When the PAID pushbutton is depressed, the word FAIL appears on display 88 indicating that the key must be present to gain access to the mode entered. It should be understood that mode 20 cannot be used without the manager's key and that the key does not restrict access to information displayed in other modes. The key only prohibits inputs that may change console totals or prices. For example, an operator can enter mode 13 and display the price set at each pump without the key being present in key lock switch 86. From the foregoing, it should be apparent that mode 20 determines the security and accuracy of the totals and prices that are present in the system.

While the mode selecting switch 80 determines the above described operating modes, the STOP pushbutton 78 effectively provides yet another mode of operation. When the operator depresses the STOP pushbutton to enter the stop mode, a light within the pushbutton lights and the left display 88 goes blank with the right display providing the word VOL and all dispensers continue in operation. By depressing a dispenser select pushbutton 76, the corresponding dispenser stops flow and any number of dispensers may be stopped in this manner. Those dispensers which have been stopped will be shown by lighted dispenser select pushbuttons. Depressing a lighted dispenser select pushbutton will permit that pump to again operate and its internal light will be extinguished. To leave the stop mode (for the purpose of viewing the dollar and gallon amounts for a transaction at a pump that has not been stopped, for example), the STOP pushbutton 78 can be depressed and the displays 88 and 90 will return to show the dispenser selected and the dollar and gallon amounts using the $-VOL pushbutton 68 in the conventional manner. If any dispensers are stopped, the STOP button lamp will flash on and off so long as the console is not in the stop mode. When the STOP pushbutton flashes, normal prepay and postpay operation may proceed so long as the stopped pumps are not involved. Depressing the STOP pushbutton again causes the console to return to re-enter the stop mode and in this mode, the pumps may be stopped or restarted as described above. When all stopped dispensers have been placed back in operation, none of the dispenser select pushbuttons will be lit and the STOP pushbutton can be again depressed to remove it from the stop mode and it will no longer flash, since no dispensers were stopped when it was removed from the stop mode. The mode is desirably used to stop dispenser operation in an emergency, such as when a customer is lighting a cigarette when dispensing gasoline or the like. The dollar and gallon amounts dispensed by the dispenser that is stopped are not lost by the console when it is stopped and when the dispenser is re-enabled, the dollar and gallon amounts continue on from the amounts shown prior to the stopping operation.

Figure 5:
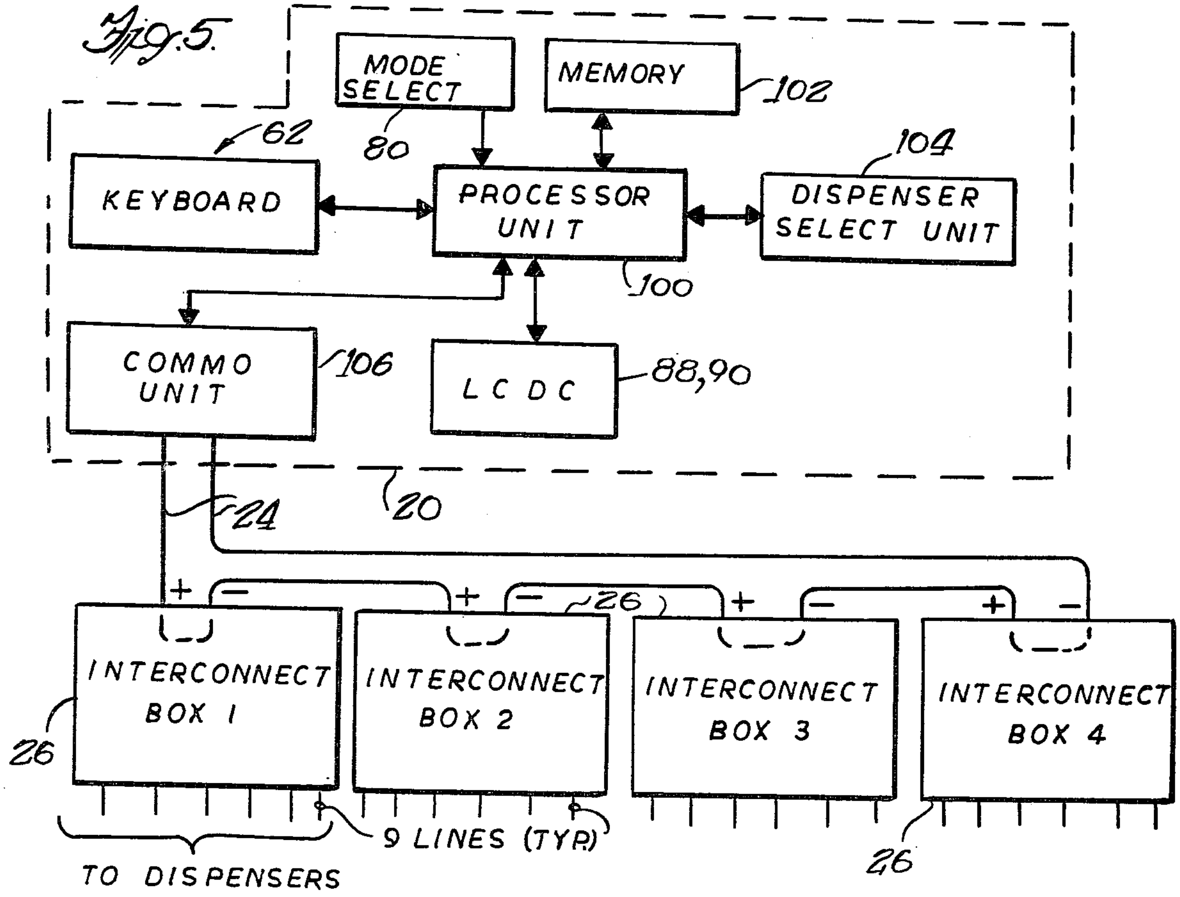
FIG. 5 is a block diagram illustrating certain components of the system embodying the present invention.

The system of the present invention is also capable of performing diagnostic checks on various portions of the circuitry shown in the block diagram of FIG. 5 and thereby permits a technician or manager of the station to perform periodic checks to determine if any malfunction is occurring as well as to pin point the location of malfunctions that are experienced during the operation of the system. The diagnostic checks can be performed by using the mode select switch 80 to set the system into one of several diagnostic check modes 70 through 75. In these modes, the circuitry associated with the blocks shown inside the dotted line in FIG. 5 for the console of the system can be checked.

More specifically, when the mode select switch is set in mode 70, the keyboard circuitry 62 can be checked. When in this mode, depressing each of the numerical pushbuttons 0 through 9 causes the corresponding number to appear on the display 90 and the function pushbuttons CLEAR, $-VOL, CHANGE, AUTHORIZE, PAID and the period produce one of the numbers 11–16 in the display 90. When the mode select switch is placed in mode 72, the communication unit 106 is tested by testing the communication loop Nos. 1 and 2, and provides the number 1 in the display 88 in the event that the first communication loop is faulty, the number 2 if the second communication loop is faulty and the number 3 if both loops are faulty. If the communication unit is properly operating the COMMO display word in display 88 will toggle on and off. If only one loop is used in the system the unused loop will provide an indication that it is faulty.

To test the liquid crystal display units 88 and 90, the mode select switch is placed in mode 74 and in this mode, all of the words of the display toggle on and off and the numbers will sequence from 0 through 9 as well as through a blank. When the dispenser select unit 104 is to be tested, the mode select switch is placed in mode 71. When in this mode, depressing each of the dispenser select switches 76 will cause its internal lamp to toggle on and off and the number corresponding to the depressed switch will appear on display 88.

When the processor unit 100 is to be tested, the mode select switch is placed in mode 75 which causes the output lines of the processor unit to toggle, resulting in all of the pushbuttons and displays to simultaneously toggle on and off. When an input is changed, such as by depressing any of the pushbuttons of the console, a beep will occur from the audio alarm 130. The mode select switch can also be tested when the mode select switch is in the processor unit diagnostic test mode 75. To do so, the AUTHORIZE pushbutton is pressed which enables the mode select switch 80 to be switched through the various mode numbers and the corresponding number of that mode will be shown by the left display 88. To remove the console from this mode, the PAID switch is pressed, which switches it back to the normal mode 75, and permits the mode switch to be used to change to other modes.

To check the operation of the memory 102, the mode select switch is placed in mode 73 and in this mode, data from the various memory integrated circuits is sequentially removed, sets of all zeros and all ones alternately inserted for testing the memory integrated circuit and the data then returned to the particular memory integrated circuit. If a particular memory integrated circuit is not properly operating, its identification number will appear on display 88. When the checking is completed, the number 96 will be displayed on the left display 88 if all memory integrated circuits are properly operating. Since there are two arrays of memory integrated circuitry in the memory unit 102, as will be hereinafter described, the diagnostic check for the memory unit 102 also provides information as to which array is faulty. In the event that all of the memory integrated circuits in one of the arrays is malfunctioning, the number 97 will appear, and the number 98 will appear if all of the memory integrated circuits of the other memory array is malfunctioning. If both arrays are malfunctioning, then the number 99 will appear in the display 88.

Thus, the foregoing diagnostic modes provide an easy means for determining the location of a malfunction in the console and thereby minimizes the time required to correct a malfunction, which can result in reduced downtime for the system. An owner can perform the diagnostic checks himself and provide valuable information to repair, and may enable the owner to merely place a telephone call and inform the technician. It may then only be necessary for the technician to bring a new circuit board to the station location and insert it into the console and thereby immediately correct the problem and make the system operational.

While the above described modes illustrate the extreme flexibility and expansive functional capability of the system and adequately describes the operation from the standpoint of the attendant or station manager using the system, the bulk of the circuitry that carries out the above described operations is physically contained within the console 20, which will now be described. As previously mentioned, the system may alternatively include the electronic dispenser display 58 or it may be operated with a conventional mechanical computer apparatus located in the dispenser, with the pulse generating device 44 being interconnected therewith.

Turning now to the block diagram of FIG. 5, which illustrates the major blocks of the circuitry in the console 20 (shown within the dotted lines), together with the lines 24 that extend to the interconnect boxes 26 which interconnect the console with the dispenser circuitry and associated apparatus. As shown in FIG. 5, the console incorporates a processor unit 100 which is interconnected to various other circuitry, including an external memory 102. The processor unit 100 also has internal memory that contains the operating programs for carrying out the functional operations for the various modes that have been previously described. The mode select switch 80 is interconnected with the processor unit 100, as is the keyboard 62 and a dispenser select unit 104 which includes the dispenser select switches 76. The circuitry for the liquid crystal displays 88 and 90 is also interfaced with the processor unit 100, as is a communication unit 106 for providing communication to and from the interconnect boxes 26 via the two conductor current loop 24 as shown. In the illustrated embodiment, there are four interconnect boxes, each of which can interconnect the console 20 with a total of six dispensers.

With respect to the detailed circuitry that corresponds to the block diagram of FIG. 5, reference is made to FIGS. 6a and 6b which together comprise a detailed schematic circuit diagram showing the interconnection of the major blocks shown in FIG. 5. Thus, the processor unit 100 is shown as comprising two half-sections, with one of the half-sections being shown in each of the FIGS. 6a and 6b. Referring to FIG. 6a, the processor unit 100 has a plurality of lines 110, including eight data bus lines designated DB0-DB7, four memory control lines ROMC0-ROMC4, a write line, a clock line Φ, a data bus data ready line DBDR, an interrupt request line INT REQ, as well as a PIR OUT line and logic +5 supply a +12 volt supply and logic ground lines. These lines 110 extend to the external memory unit 102, as well as to each of the illustrated dispenser select units 104 and can extend to a peripheral input-/output unit 112 which may be used to interface other peripheral devices that may be used with the system, such as credit card reading devices and the like. Referring to FIG. 6b, the processor unit 100 is connected to the keyboard 62 via lines 114, to the communication unit 106 via lines 116, and to the liquid crystal display units 88 and 90 circuitry via lines 118. A switch 120 is connected to the processor unit 100 for selecting options that may be sold with the system in the event that such is desired. For example, the system of the present invention may be configured to prohibit prepay operations and the stacking feature may also not be ordered by a customer. One of the lines determines whether the system is to be in English or metric. A configuration control tab switch 122 can be used to control the number of dispensers that can be used with the system as originally ordered by the station owner or operator. Since the modular construction of the system permits easy expansion from a very few dispensers, up to a total of 24 dispensers (provided the stacking feature is not included), the price for the system may be significantly lower for a few dispensers as opposed to a system having many. By using a configuration control circuit, the maximum number of dispensers that can be controlled with a system will be preset so that the owner cannot easily expand the system to control additional dispensers for which he has not paid for. The keyboard unit 62, communication unit 106 and liquid crystal display unit 88, 90 are powered by lines 124 which extend to a power supply (not shown). Three lines 126 from the processor unit 100 also extend to the power supply and provide signals for use with a backup power supply system, which is fully described in the aforementioned cross referenced application of Graf and Krystek specifically entitled a Battery Backup System and assigned to the same assignee as the present invention. One of the power supply lines 124 is connected to an audio alarm 130 which is also connected via line 132 to the processor unit 100 and the processor unit thereby controls the operation of the alarm for issuing the beep tones that were described with respect to the functional operation of the console 20. The operator key lock switch 86 is shown near the lower portion of FIG. 6*b* and is connected via line 134 to the processing unit. The communication unit 106 has the line 24 for connection to the interconnect boxes 26 as described with respect to FIG. 5 and can also include a second line 24' which may be required if the alternative embodiment of the system is used which includes the electronic dispenser displays 58. If the electronic dispenser displays are not incorporated in the system, a single communication loop can effectively operate the maximum number of 24 dispensers utilizing four interconnect boxes 26. The mode select switch 80 is connected to a mode select circuit 138 that is part of the processor unit 100 and will be hereinafter described.

Turning now to the processor unit and referring to FIGS. 7*a* and 7*b* which together comprise an electrical schematic diagram of the processor unit 100, it includes a central processing unit or CPU 140 (FIG. 7*a*) and has the data bus, control and voltage supply lines 110 previously described extending to four program storage units 142, 144, 146 and 148 which are shown in FIG. 7*b*. The program storage units comprise read only memory together with input/output ports for communicating with the other components of the system, such as the liquid crystal displays 88, 90, the communication unit 106 and the keyboard 64 as previously described. With respect to the function that is controlled by the output lines of each of the program storage unit output ports, they are clearly designated as shown. The CPU 140 also has two output ports for controlling the operation of the communication unit 106 and for controlling the battery backup system operation via lines 126.

The processor unit 100 in the illustrated embodiment is a microprocessor, model F8 system as manufactured by the Fairchild Semiconductor Corporation of Mountain View, Calif. The circuit diagrams for the program storage units and the central processing unit, as well as the operating manuals for the F8 system are hereby incorporated by reference herein. The model numbers for the CPU and program storage unit are shown in parenthesis in the appropriate blocks in the drawings. Each of the program storage units 142 comprise read only memory having about 2K bit capacity and two input/output ports for communicating with the other circuitry of the system. The program listings which are attached hereto as Appendix A are contained within the program storage units for carrying out the operation of the processor unit 100 in the console and in the interconnect circuitry as well as in the electronic dispenser display unit, if provided.

Referring to FIG. 7*a*, the mode select switch 80 comprises the thumb wheel switches 82 and 84 which are connected via four lines 150 and 152, respectively, to respective sets of AND gates 154 and 156, which have output lines 158 connected together and which extend to port 04 of the program storage unit 142. A line 160 is connected to one input of the NAND gates 156 for selecting the least significant digit, i.e., the switch 84, the line 160 being connected to port 09 of the program storage unit 144. Similarly, a most significant digit select line 162, also from port 09 of program storage unit 144, is connected to one input of the NAND gates 154 for selecting the most significant digit from thumb wheel switch 82. When either of the select lines 160 and 162 is true, then the binary number on the respective set of lines 152 or 150 is gated through the appropriate set of AND gates and appears on line 158 that extends to port 04 of the program storage unit 142. Through a two step operation, the mode in which the mode select switch 80 is set can be entered into the processor unit 100. Referring to the right portion of FIG. 7*b*, a power-up reset and stall circuit 166 is shown to include a 7 bit binary counter 168. The liquid crystal display unit is driven by a 35 Hz frequency signal and it is always produced when power is provided to the console 20. A 35 Hz signal appears on line 170 that is also applied to the input of the counter 168. If there is a problem with the CPU 140 in that it is stopped, or stalled in a program loop or is otherwise malfunctioning, a stall toggle signal on line 172 will stop occurring, and as a result of this, the counter 168 will overflow because the stall toggle signal continually resets the counter 168. If the counter reaches its terminal count, it will place a transistor 174 into conduction and line 176 connected to the collector thereof will go low and produce an external reset signal on line 178 that extends to the CPU 140 for resetting it. It is also important that the CPU 140 be made aware that a stall has occurred as opposed to a fresh start-up operation. This is due to the fact that when the CPU 140 is undergoing a fresh start-up, one of the initial events that occurs is to clear the data from the external memory 102. It should be apparent that if it is not a fresh start-up condition, then potentially valuable data in its memory would be destroyed. If a stall condition occurs, a line 182 connected to the program storage unit 148 will remain high and will not change the status of any of the registers in the CPU 140. Under a fresh start-up condition, the power-up reset active line 182 will go low for one full second and the external reset will go low for about ½ second. During a fresh start-up, the power-reset active line 182 signal will be present and the processor unit will thereby know it is a fresh start-up. Under a stall condition, the power-up reset active signal on line 182 will not be present. The power-up condition and the stall condition are therefore correctly identified which will preclude the memory from being erased during a stall condition as is desired.

The detailed schematic diagrams for the random access memory unit 102 are shown in FIGS. 8*a* and 8*b*, the former of which includes the lines 110 that are connected to the processor unit 100 as previously described with respect to FIG. 6*a*. The lines extend to a static memory interface 190 which uses the ROMC and data bus lines DB0–DB7 signals from the processor 100 and selects the appropriate address lines for selecting the various memory units. The data bus lines DB0–DB7 also extend to FIG. 8*b* to a plurality of tri-state gates 192 which gate the data onto the bus during a memory read condition. While the full memory array has not been reproduced in FIGS. 8*a* and 8*b*, representative memory units are shown and comprise a random access memory 194 which has bit No. 7 information in a first array of RAM (designated RAM 1), with bit 3 data being supplied by a RAM 196 in the same array. A second array (designated RAM 2), includes a RAM 198 containing bit 7 data and similarly, a RAM 200 assoicated with the second array contains bit 3 information. The circuitry also includes ultraviolet programmable read only memories 202, 204 and 206 that can be used to store additional program, the ultraviolet memories being conducive to reprogramming if desired.

When data is to be written into memory, the data as well as the address information will appear on the data bus lines, and the ROMC control lines provide signals to the static memory interface 190 for selecting the appropriate address via lines 210, line 212 and lines 214. The lines 214 extend to a decoder 26 which has chip select output lines 218, labeled CS1 through CS7, with the chip select lines CS1 through CS7 extending to the ultraviolet memories 202, 204, 206 and others of the array that are not specifically illustrated. The CS7 chip select line 218 extends to a NAND gate 220 via inverter 222. The NAND gate 220 has its other input supplied by line 212 which is inverted by an inverter 224 and the NAND gate 220 output appears on line 226. Line 212 also is directly connected to a second NAND gate 228 having an output on line 230. Lines 226 and 230 are connected to a relay indicated generally at 232 which is controlled by a coil 232*a* associated with a circuit that prohibits access to the RAM memories during predetermined times, as is fully described in the aforementioned Graf and Krystek application entitled a Battery Backup System. The lines 226 and 230 provide chip select signals to the various RAM memories and effectively provide only one of the two RAM arrays for writing data into them or reading data out. By operation of the NAND gates 220 and 228, and the inverter 224, it should be understood that only one of the lines 226 or 230 can be active at one time, which permits the parallel connection of the RAM arrays, as shown in the drawings, with RAM 194 and 198 being interconnected, as are RAMs 196 and 200.

When data is to be written into an address location in RAM 194, for example, the appropriate address lines 210 are active and the data on the proper bus data line is applied to the data input of the memory. Since RAM 194 is specified as supplying or receiving data bit 7, the bus data line DB7 is shown to be connected to the data in ($D_{in}$) terminal of RAM 194 and, similarly, the data out ($D_{out}$) terminal is connected to the tri-state gate 192 having its output connected to the bus data line DB7. The read/write command line is connected to the static memory interface 190 and has a read/write control line 234 which connects to all of the RAM memories and premits the data to be written in or read out as desired. In the event the DBDR line is active, then data from the RAM memories cannot be asserted onto the data bus lines DB0–DB7, since the DBDR lines is applied to a NAND gate 240 via a series of buffers and inverters 242. The CPU read line 244 will be active when the central processing unit 140 is attempting to read information from the external memory 102, i.e., the memory shown in FIGS. 8*a* and 8*b*. Even though the CPU issues a read command on line 244 which is applied to the NAND gate 240, an active DBDR signal will preclude the gate from becoming true which is necessary for the gates 192 to be enabled. The DBDR signal originates from the program storage units of the processor unit 100 and are active when one of them is asserting data onto the data bus lines. It asserts the active DBDR signal so that other devices in the system will not try to assert data onto the data bus.

For the operator to input data into the console using the keyboard, circuitry associated with the keyboard switches 62, including the numerical key switches 64 and the function key switches 66, 68, 70, 72 and 74 is shown in FIG. 9. With the exception of the AUTHORIZE switch 72 which is a separate input, the other numerical and function switches are part of a row-column matrix, with each switch having two sets of contacts which uniquely identify the switch which has been depressed. The row and column lines are connected to a decoder 250 which decodes the row-column matrixed signals into binary coded hexadecimal output signals on lines 252 which are buffered by buffers 254 and connected to one input of a number of NAND gates 256 whose outputs appear on line 158 which are connected to port 04 of the program storage unit 142. A key select line 258 from port 09 of program storage unit 144 is connected to the other input of all NAND gates 256 and enables these gates when the CPU wishes to receive the data from the key switch. The hexadecimal coded output truth table from the row-column matrix is shown as a part of FIG. 9.

With respect to the dispenser select switches 76 located on the console for use by the operator, the circuitry associated with these switches is shown in FIG. 10 and comprises a peripheral input/output circuit 260 that is equivalent to the program storage units described with respect to FIG. 7*b*, but without program information stored within it. The input/output circuit 260 interfaces the processor bus unit lines 110 and utilizes eight lines for the switches 76 and another eight lines for energizing lamps 262 located within the switches 76. As shown in FIG. 10, there are a total of eight pushbutton switches 76, with each of the switches having an associated lamp. If more than eight switches are installed in a console, additional circuitry shown in FIG. 10 is necessary. As previously mentioned, a total of 24 switches can be used in the illustrated system.

The circuitry associated with the displays 88 and 90 is shown in FIGS. 11*a* and 11*b*, with the latter illustrating the displays having the numerical and word indicators that have been generally described in FIGS. 2 and 3. The input lines 118 to the display circuitry are shown in FIG. 11*a* and are clearly designated as shown. As previously mentioned, the displays 88 and 90 are liquid crystal displays which require a symmetrical, preferably zero DC component drive signal or they can become permanently coated and effectively destroyed. A timing circuit indicated generally at 264 produces a 70 Hz signal on line 266 that is divided by a flip-flop 268 to produce a 35 Hz signal on line 270 that extends to the back plane of each of the display digit segments and words. When any of the lines 274 are active, the back plane drive signal applied via line 270 is gated by exclusive OR gates 276 (FIG. 11*b*) which have output lines 278 extending to the displays and causes the proper display words to be shown. With respect to the numerical indicators 92 and 94 in the respective displays 88 and 90, input lines 280 provide an octal coded digit selection which is decoded by a decoder 282 and activates the appropriate output line 284 for selecting the digit that is to be activated. The liquid crystal display numerical digits are seven segment digits and the binary coded decimal digit data appears on the four identified BCD digit data lines 274 that are connected to each of the binary coded decimal to seven segment decoders 286 each of which has seven output lines 288 which extend to the respective segments for displaying the proper integer. Thus, when the lines 280 select the proper digit, the appropriate decoder 286 is enabled and the BCD digit data is applied to it for identifying which ones of the seven segments are to be activated and displayed.

To communicate with the circuitry in the interconnection boxes 26 or the electronic display means 58 in the event they are used, the communication unit 106, the specific circuitry of which is shown in FIG. 12, has lines 116 connected to ports 01 and 00 of the CPU 140. The communication unit 106 comprises two universal asynchronous receiver transmitters 290 and 292 which are each connected to the ports of the CPU 140 and are operable when activated by the communication (commo) loop select line which selects loop No. 1 when it is high and loop No. 2 when it is low. The UART 290 is operable to provide communication on loop No. 1, i.e., lines 24 and the UART 292 is for use with a communication loop No. 2, i.e., lines 24'. As previously mentioned, when the interconnection boxes 26 are used, a single loop may be sufficient to communicate with all of the dispensers that can be connected to four interconnection boxes and a second loop is only necessary in the event that an electronic display means 58 is incorporated into the system. The UART select line 294 extends directly to one input of four NAND gates 296 and through inverter 298 to one input of four NAND gates 300 which are connected to the UART 292. Thus, depending upon the level asserted on the line 294, either NAND gates 296 or NAND gates 300 will be enabled so that signals on control lines 302 are gated to the respective UARTS 290 and 292 for operating the same. A master reset line No. 1 extends to UART 290 and a second reset line extends to UART 292. A SFD (status flag disable) line 302 is used to control the UARTs so that data lines 289 can be used to transmit data to and from the UART to the CPU 140. When the SFD line is high, the data is transmitted between the CPU and the UART and, when the SFD line is low, the status signals of the UARTs are asserted on the lines 289.

To transmit the information onto the communication loop lines 24, the data is asserted on line 306 which is connected to a light emitting diode 308 via an inverter 310. The LED 308 is part of an opto-isolator, which cooperates with a photo-transistor 312 that has its emitter connected to the base of a transistor 314, its collector connected to the collector thereof and its base connected via a resistor 316 to the base of transistor 314. The emitter of transistor 314 is connected to the ground line of the communication loop via a resistor 318. The collector of transistor 314 is connected via line 320 to a light emitting diode 322 that is connected to the upper one of the lines 24. The combination of the photo-transistor 312, resistor 316, transistor 314 and resistor 318 comprise a constant current source, providing a constant current of about 20 milliamps. When the UART 290 is transmitting onto line 24, the operation of the photo-transistor 312 will switch the transistor 314 in and out of conduction. When no data is being communicated, conduction occurs through the collector-emitter circuit of transistor 314. When data is being received by the UART from the upper line 24, the light emitting diode 322 will switch a photo-transistor 324 in and out of conduction, and the collector of photo-transistor 324 is connected through inverter 326 to line 328 which is connected to the receive terminal of the UART. The circuitry for the UART 292 for communication onto the second communication loop operates substantially similar to that described with respect to the communication loop No. 1. The STOP switch and an associated stop lamp 330 is also shown in FIG. 12, it merely being located in FIG. 12 because it is physically positioned on the communication unit circuit board because this circuit board is located in the console in physical proximity to the location of the STOP switch 78.

The baud rate of the UARTs is supplied by the 2.0000 MHz clock appearing on line 334 which extends to a counter 336 having a number of outputs any one of which can be selected using a jumper 338 to select the desired baud rate for clocking the UARTs via line 340.

Turning now to the interconnection box circuitry shown in FIGS. 13*a*, 13*b*, and 13*c*, it can be used with the system of the present invention in the event that dispensers having mechanical computers are in the system as opposed to the electronic dispenser display means previously mentioned. In the event the electronic displays are used, the interconnection box circuitry is not required, as many of the functions carried out by the interconnection box circuitry is accomplished by other circuitry that will be described in connection with FIGS. 15*a*, 15*b* and FIG. 16.

The interconnection box circuitry is shown in FIGS. 13*a*, 13*b* and 13*c*, which together comprise an electrical schematic diagram of the circuitry, and referring initially to FIG. 13*a*, it includes a central processing unit (CPU) 350 which is substantially similar to the central processing unit 140 located in the console. The CPU 350 has bus lines 352 which extend to program storage units 354 and 356 which have memory for storing programs for operating the CPU and also include input/output ports for connection to circuitry (FIG. 14) associated with the dispensers that are connected to the interconnection box. As previously mentioned, each interconnection box can have up to six dispensers connected to it so that the circuitry shown in FIGS. 13*a*, 13*b* and 13*c* will necessarily be duplicated for each series of six dispensers that are to be controlled by the system. The ports of the program storage units 354 and 356 are designated and include pump request signals for each of the possible six dispensers, slow flow control signals, flow/flow reset signals as well as fast flow/present signals for the respective dispensers. The program storage unit 354 has two lines 358 which are connected to switches 360 that can be set to provide a two bit binary code for uniquely identifying each of the four interconnection boxes. The CPU 350 has ports 0 and 1 that are connected via lines 362 to a UART 364 (FIG. 13*b*) that operates substantially similarly to the UARTs previously described with respect to FIG. 12. Data received from the console 20 is received on line 366 and data that is transmitted to the console is output on line 368, with the circuitry indicated generally at 370 comprising opto-isolators that operate in the manner previously described. The lines 24 of FIG. 13*b* connect to the communication unit 106 of the console 20 and to other interconnection boxes 26 connected in the loop as shown in FIG. 5. The UART 364 is clocked by line 372 from a counter 374 which is driven by the clock line 376 from the CPU 350. A stall circuit indicated generally at 378 provides an external reset on line 380 for resetting the CPU 350 in the event that it stalls.

Referring to FIG. 13*c*, the bus lines 352 extend to a static memory interface 384 which performs the same function as the static memory interface 190 described with respect to the memory illustrated in FIGS. 8*a* and 8*b*. However, with respect to the circuitry shown in FIG. 13*c*, there are considerably fewer random access memory units 386 and ultraviolet programmable read only memory units 388 associated with the central processing unit 350. Address lines 390 from the static memory interface 384 extend to the address lines of the memory units 386 and 388 and address lines 392 extend to a decoder 394, which together with logic circuitry, indicated generally at 396, selects the appropriate memory unit which is to have a read or write operation performed. A read/write command line 398 extends to the read/write input of the RAM units 386. It should be apparent that the circuitry shown in FIG. 13*a*, 13*b* and 13*c* comprises a scaled down version of the circuitry of the console and operates in a similar manner, receiving commands from the console which are carried out and supplying data from the dispenser to the console. The interconnect box interfaces the console with other circuitry in the interconnect box shown specifically in FIG. 14 which is connected to the ports of the program storage units 354 and 356.

Turning to the circuitry shown in FIG. 14, the pulses corresponding to the flow of fluid that is being dispensed and originating from the pulse generating unit 44 connected to the mechanical computer appear on line 400 which extends to the light emitting diode portion 402 of an opto-isolator 404 which has a photo-transistor 406 that is switched on and off in response to the operation of the diode 402. A capacitor 408 integrates the input and effectively removes noise that may be provided on line 400 and also removes the effect of bouncing of mechanical contacts in the event that the pulses are supplied by the type of pulse generating unit that has relay, as opposed to the aforementioned application of Hurley and Krystek. The collector of transistor 406 and the capacitor 408 are connected to line 410 which extends to a Schmidt trigger 412, the output of which appears on line 414 that extends to the clock input of a flip-flop 416. The flip-flop 416 is set to receive a pulse on the clock line 414 and effectively stores it until it can be read by the CPU 350. Because the system may contain a large number of dispensers, the CPU may not operate quickly enough to "catch" every pulse as it occurs, particularly if there are a large number of pulses per unit of cost. In the present system, there may be ten pulses for each one cent of product that is dispensed. Accordingly, the flip-flop 416 is used to store the pulse until the CPU reads the flow data. This is done by a flow data input strobe (FDIS) signal on line 418 which is connected to one input of NAND gate 420, the other input of which is supplied by line 422 that is connected to the Q-output of the flip-flop 416. When the FDIS strobe on line 418 enables NAND gate 420, the flow pulse is passed to line 424 and is read by the CPU 350. When it is received, the CPU sends a flow data reset (FDS) signal on line 426 which enables gate 428 and provides a signal on line 430 which extends to a reset terminal of the flip-flop 416 and resets the same so that it is ready to receive the next pulse.

When the pump request switch is turned on, line 434 extending to an opto-isolator 436 is switched high and its photo-transistor 438 is switched into conduction, providing current on a line 440 and charges a capacitor 442. When sufficient charge is present in the capacitor 442, it will activate a Schmidt trigger 444 having an output which is buffered by buffer 446 and produces a signal on line 448 that extends to the CPU 350 indicating that a pump request has been made. The reset complete signal from the dispenser appears on line 450 and the circuitry associated with the reset complete signal is substantially identical to that described with respect to the pump request signal, ultimately providing the reset complete signal on line 452 that extends to a port in the CPU 350. This port of the CPU is also used to send a reset motor enable signal which extends to an inverter 454 that is connected to the operating coil 456 of a relay having contacts 456*a* which operate the reset motor at the dispenser. A fast flow signal from the CPU 350 is asserted on line 460 which is connected to an inverter 462 and controls the coil 464 having contacts 464*a* for controlling flow solenoid valve in the dispenser. The line 460 is also connected to a switch 466 which is used to inform the CPU that a dispenser is actually present. When one does exist, the switch 466 is placed in its open position and when it is not connected to a dispenser, it is placed in the closed position. The slow flow signal from the CPU 350 appears on line 468 that is connected to an inverter 470 and then to a relay coil 472 having contacts 472*a* for controlling the slow flow solenoid valve to provide slow flow by the dispenser.

In the event that the electronic dispenser display means 58 is used in the system, the interconnection box circuitry previously described with respect to FIGS. 13*a*, 13*b*, 13*c* and 14 is unnecessary since many of the functions and operations that are carried out by that circuitry will be performed by the circuitry associated with the electronic dispenser display means 58. The circuitry for the electronic dispenser display means 58 is shown in FIGS. 15*a*, 15*b* and 16, with the latter providing the driver circuitry for the liquid crystal displays themselves. Referring to FIGS. 15*a* and 15*b* which together comprise an electrical schematic circuit diagram of the display means 58, it is shown to include a pump power supply section shown to the left of the dotted line in FIG. 15*a* and the dispenser processor unit portion of circuitry, shown to the right of the dotted line. The line voltage AC power is applied on lines 480 and 482 which extend to primary winding of transformers 484 and 486, with the secondary winding of the transformer 484 supplying power to heaters for the displays which may operate in extremely cold environments. The transformer 486 has secondary windings connected to full wave rectifiers 488 which have their outputs regulated by voltage regulator circuits indicated generally at 490. The regulators supply +5 volt power on line 492 and +12 volt power on line 494 for operating the processing unit circuitry. Lines 480 also extend to a relay 496 having contacts 496*a* and an operating coil 496*b* to a relay 498 having contacts 498*a* and an operating coil 498*b*, and to a relay 500 having contacts 500*a* and an operating coil 500*b*. The relays respectively provide power to the fast flow solenoid valve via line 502, to a slow flow solenoid valve via line 504, and a submerged pump via line 506.

The circuitry includes a central processing unit 510 which has data bus lines, ROMC control lines and other lines 512 which extend to a peripheral input/output unit 514 as well as to a static memory interface 516 which interfaces with a programmable read only memory 518. The output lines 520 of the programmably read only memory 518 are interconnected with the bus data lines DB0 through DB7. The CPU receives and sends data to the console 20 via lines 24 that are connected to the communication unit 106 in one or two communication loops that are substantially similar to the communication loops extending between the communication unit 106 and the interconnect boxes 26 shown in the block diagram of FIG. 5. The lines 24 are connected to two opto-isolators 520 and 522 which, together with the associated resistors and transistor 524 perform the same function as the circuitry that has been previously described with respect to the communication unit in FIG.

12. Thus, data coming into the CPU 150 appears on line 526 and is buffered by a buffer transistor 528 and is input on line 530 to the CPU 510. Similarly, data from the CPU is sent on line 532 and is buffered by buffer transistor 534 and extends to the opto-isolator 522 via line 536. When the pump handle at the dispenser is switched by the customer, the switched line 540 extends to an opto-isolator 542 and provides a signal on line 544 that charges a capacitor 546 which, when sufficient charge is present, will actuate a Schmidt trigger 548 and provide a signal on output line 550 to the CPU 510 indicating that the reset has been completed.

The pulses from the pulse generating unit are applied to the peripheral input/output unit 514 via lines 560 and 562 which are respectively connected to outputs of circuits indicated generally at 564 and 566 that shape the signals that originate in the pulse generating unit and which appear on lines 568 and 570. The pulse shaping circuitry as well as the pulse generating units themselves are described in detail in the aforementioned Hurley and Krystek application. As is comprehensively described therein, each pulse generating apparatus may have two sets of signals generated during operation and, accordingly, the separate pulse shaping circuits 564 and 566 are provided. The 35 Hz signal for driving the liquid crystal displays of the display means is produced by a flip-flop 574 and appears on line 576 extending to the displays and also on line 578 which is connected to a counter 580 which comprises a portion of a stall circuit which provides an external reset signal on line 582 extending to the CPU 510 in a manner similar to that described with respect to the other stall circuits of the system. Lines 586 connect the CPU 510 to an identification coded insert 588 which provides a unique identification code for each dispenser so that the console knows the dispenser with which it is communicating. The peripheral input/output device 514 has lines 584 which extend to the circuitry shown in FIG. 16 and provide the data information for the liquid crystal displays that provide the cost per gallon, as well as the totals for the number of gallons that are dispensed in a sale transaction and of the cost of the sale.

With respect to the displays that are located in the dispensers, and referring to FIG. 16, a representative display is illustrated and is one of three displays that are required for each dispenser. More specifically, the circuitry of FIG. 16 will be reproduced for the cost per gallon display, the total cost display and for the total gallon display. Jumpers 600 can be used to select which of the displays the circuitry is to be used for. The circuitry includes two liquid crystal displays 602 and 604 which are identical to one another, each displaying five numerical digits. The two displays 602 and 604 provide identical information and are preferably located on the front and back sides of the dispenser so that the information can be viewed by customers from either side of the dispenser islands. The digits that are to be displayed are selected by activating select lines 606 which extend to respective AND gates, each of which has its output connected to one of the binary coded decimal to seven segment decoder driver units 610 for enabling the same. The decoder drivers 610 have binary coded data applied to input line 612 and the output lines 614 of the decoders extend to the proper digit for displaying which of the segments of the seven segment display are to be activated.

From the foregoing description, it should be appreciated that a monitoring and control system for use with gasoline pumps or dispensers in a self-service gasoline station or the like has been illustrated and described which offers superior and greatly expanded operational capability when compared to prior art systems. The system of the present invention can be conveniently configured for installation in stations having a few dispensers or a large number of dispensers. The system is also adapted for use where prior systems have been installed having electrical conductors controlling motors, valves and the like, or it can be installed using electronic dispenser display means if desired. The expanded capability of the system permits keeping accurate control of inventory, as well as providing totals for various time periods, such as shift totals, day totals, extended period totals and grand totals. The system can also be easily configured to permit stacking, as well as prepay and postpay transactions and has provision for prohibiting certain operations through the use of an operator key switch. The selective enabling of certain operating modes lets the station owner control which types of operation that are to be permitted by an operator.

While certain preferred embodiments have been illustrated and described, various modifications, equivalents and alternatives will become apparent to those skilled in the art. Accordingly, the scope of the present invention should be defined only by the appended claims and equivalents thereof.

Various features of the invention are set forth in the following claims.

What is claimed is:

1. A system for monitoring and controlling the operation of a plurality of dispensers for dispensing a fluid such as gasoline or the like, said dispensers having electrically actuable flow control means and means for metering the flow of fluid being dispensed, comprising:

processing means for carrying out operations under the direction of operating programs, said processing means including memory means for storing information relating to the data generated during operation of said dispensers and for storing program information for operating the processing means;

operating console means for controlling the operation of said dispensers and for displaying information to the operator relative to the operation of said system, said console means including display means operably connected to said processing means for selectively providing a visual alpha-numeric display of information relating to the operation of each of said dispensers and of said system, keyboard means operably connected to said processing means for inputting functional and numeric information relating to transactional operations concerning said dispensers, means operably connected to said processing means for selecting a dispenser of interest, the selection of a dispenser enabling transactional operations to be carried out by said selected dispenser and said display means to display information relating to the transactional operations of said selected dispenser, provided said system is in a one of certain selected operating modes;

means operably connected to said processing means for selecting one of a plurality of operating modes of said system, each mode selected calling predetermined operating programs from said memory means for directing said processing means;

means operatively connected to the flow metering means for generating electrical signals indicative of the volume of fluid flowing therethrough, said electrical signals being forwarded to said processing means;

means operatively connected to the flow control means of each dispenser for operating the same to selectively enable and disable flow through the dispenser in response to receiving electrical signals from said processing means; and switching means for providing signals to said processing means that selectively enable and disable transactional operations in certain of said operating modes, said switching means providing signals to said processing means for activating an access selecting mode, the selection of said access selecting mode by said operating mode selecting means together with operation of said switching means permitting the selecting and selective enabling of operating modes by said keyboard means wherein all transactional operations of a mode that has been selected and enabled can be carried out without operating said switching means.

2. A system as defined in claim 1 wherein said switching means comprises a lock switch that is physically incapable of being operated unless a key member is inserted in the lock associated therewith.

3. A system as defined in claim 1 wherein said display means provides cost and quantity information of the fluid dispensed by a dispenser when said dispenser is selected by said dispenser selecting means and said system is operating in certain of said operating modes.

4. A system as defined in claim 1 wherein the cost of the fluid to be dispensed by a dispenser is displayed by said display means when the numerical cost value is input by said keyboard means and one of said dispensers is selected, said processing means controlling said means for operating said flow control means to stop fluid flow when the value of the volume of fluid dispensed reaches said numerical cost value, when said mode selecting means is set in a pre-pay operating mode.

5. A system as defined in claim 1 wherein the flow control means of the dispenser is operable to dispense fluid at fast and slow rates, said processing means forwarding electrical signals to said flow control means to switch from fast to slow flow as the cost of the fluid dispensed approaches the input numerical cost value when said system is in a pre-pay operating mode.

6. A system as defined in claim 4 wherein the dispensers are of the type which also have pressure sensitive automatic shut-off nozzle mechanisms, said display means displaying the cost and quantity information corresponding to the fluid dispensed when the nozzle mechanism shuts off fluid flow, said keyboard means including a change keyboard function switch which, when activated, provides a numerical display of the difference between the cost of the fluid dispensed and the cost value that was input by said numerical keyboard means.

7. A system as defined in claim 1 wherein said keyboard means comprises a plurality of function and numerical keyboard switches, said function switches including a switch for selectively effecting displaying cost or quantity data, an authorization switch, a change switch, a paid switch and a clear switch.

8. A system as defined in claim 1 wherein said console means display means includes first and second displays, each of which is adapted to provide alpha-numeric information relating to transactional operations of the system.

9. A system as defined in claim 8 wherein each of said first and second display means comprises a liquid crystal display means.

10. A system as defined in claim 7 further including means located at one or more said dispensers in communication with said operating console means for providing a first visual display of the cost per volumetric unit of fluid that can be dispensed, a second visual display for displaying the cost of fluid dispensed in a transaction and a third visual display of the quantity of fluid dispensed in a transaction.

11. A system as defined in claim 10 wherein the selection of a dispenser by operation of said dispenser selecting means, together with inputting the cost per volumetric unit of fluid using said numerical keyboard switches and results in said first dispenser visual display displaying said cost per volumetric unit at said selected dispenser when said authorization switch is operated and said operating mode selecting means is set in a price setting mode.

12. A system as defined in claim 11 wherein each of said visual displays located at said dispenser comprises liquid crystal display means.

13. A system as defined in claim 7 wherein said display means selectively displays the total cost and total quantity of fluid dispensed by all dispensers in a preselected period when said operating mode selecting means is set in the preselected period display total operating mode.

14. A system as defined in claim 13 wherein said preselected period is ended in response to the simultaneous actuation of two specified function switches.

15. A system as defined in claim 14 wherein selection of certain predetermined dispenser numbers by said dispenser selecting means effects display of quantity information concerning fluid remaining in the corresponding specified fluid supply reservoir.

16. A system for monitoring and controlling the operation of a plurality of dispensers for dispensing a fluid such as gasoline or the like, said dispensers having electrically actuable flow control means and means for metering the flow of fluid being dispensed, comprising:

processing means for carrying out operations under the direction of operating programs, said processing means including memory means for storing information relating to the data generated during operation of said dispensers and for storing program information for operating the processing means;

operating console means for controlling the operation of said dispensers and for displaying information to the operator relative to the operation of said system, said console means including display means operably connected to said processing means for selectively providing a visual alpha-numeric display of information relating to the operation of each of said dispensers and of said system, keyboard means operably connected to said processing means for inputting functional and numeric information relating to transactional operations concerning said dispensers, means operably connected to said processing means for selecting a dispenser of interest, the selection of a dispenser enabling transactional operations to be carried out by said selected dispenser and said display means to display information relating to the transactional operations of said selected dispenser, provided said system is in a one of certain selected operating modes, said displaying means displaying the number of a fluid supply reservoir in response to actuation of the numerical keyboard switch, said dispenser selecting means comprising a plurality of dispenser switches identifying the respective dispensers, each of said dispenser switches having an associated illuminating means that illuminates to indicate assignment to the reservoir being displayed when said mode selecting means is set in the reservoir assignment operating mode;

means operably connected to said processing means for selecting one of a plurality of operating modes of said system, each mode selected calling predetermined operating programs from said memory means for directing said processing means;

means operatively connected to the flow metering means for generating electrical signals indicative of the volume of fluid flowing therethrough, said electrical signals being forwarded to said processing means;

means operatively connected to the flow control means of each dispenser for operating the same to selectively enable and disable flow through the dispenser in response to receiving electrical signals from said processing means.

17. A system as defined in claim 16 wherein actuation of an unilluminated dispenser switch illuminates the same and assigns the associated dispenser to said displayed reservoir.

18. A system as defined in claim 16 wherein said display means is adapted to provide a visual indication that one or more reservoirs have a low remaining inventory supply level.

19. A system for monitoring and controlling the operation of a plurality of dispensers for dispensing a fluid such as gasoline or the like, said dispensers having electrically actuable flow control means and means for metering the flow of fluid being dispensed, comprising:

processing means for carrying out operations under the direction of operating programs, said processing means including memory means for storing information relating to the data generated during operation of said dispensers and for storing programmed information for operating the processing means;

operating console means for controlling the operation of said dispensers and for displaying information to the operator relative to the operation of said system, said control means including display means operably connected to said processing means for selectively providing a visual alpha-numeric display of information relating to the operation of each of said dispensers and of said system, keyboard means operably connected to said processing means for inputting functional and numerical information relating to transactional operations concerning said dispensers, means operably connected to said processing means for selecting a dispenser of interest, the selection of a dispenser enabling transactional operations to be carried out by said selected dispenser and said display means to display information relating to the transactional operations of said selected dispenser, provided said system is in one of certain selected operating modes;

means operably connected to said processing means for selecting one of a plurality of operating modes of said system, each mode selected calling predetermined operating programs from said memory means for directing said processing means;

switching means for providing signals to said processing means that selectively enable and disable transactional operations in certain of said operating modes, said switching means providing signals to said processing means for activating an access selecting mode, the selection of said access selecting mode by said operating mode selecting means together with operation of said switching means permitting the selecting and selective enabling of operating modes by said keyboard means wherein all transactional operations of a mode that has been selected and enabled can be carried out without operating said switching means;

means operably connected to the flow metering means for generating electrical signals indicative of the volume of fluid flowing therethrough;

means operably connected to the flow control means of each of the dispensers for operating the same in response to receiving data therefor to selectively enable and disable flow through the dispenser;

means located at said dispenser for providing a first visual display of the costs per volume metric unit of fluid that can be dispensed, a second visual display for displaying the cost of fluid dispensed in a transaction and a third visual display of the quantity of fluid dispensed in a transaction;

means operably connected to the flow metering means, and said respective dispenser display means for receiving and storing data therefrom and also operably connected to said flow control means for sending data thereto and for communicating to and from said processing means.

20. A system as defined in claim 19 wherein said receiving, storing and communicating means includes a first universal asynchronous receiver transmitter associated with said dispenser and a second universal asynchronous receiver transmitter associated with said processing unit.

* * * * *